(12) United States Patent
Lee

(10) Patent No.: US 12,462,851 B2
(45) Date of Patent: Nov. 4, 2025

(54) SEMICONDUCTOR DEVICE AND MANUFACTURING METHOD OF A SEMICONDUCTOR DEVICE

(71) Applicant: SK hynix Inc., Gyeonggi-do (KR)

(72) Inventor: Nam Jae Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 178 days.

(21) Appl. No.: 18/457,351

(22) Filed: Aug. 29, 2023

(65) Prior Publication Data

US 2024/0386918 A1 Nov. 21, 2024

(30) Foreign Application Priority Data

May 16, 2023 (KR) .......................... 10-2023-0062767

(51) Int. Cl.
| | |
|---|---|
| *G11C 5/00* | (2006.01) |
| *G11C 5/06* | (2006.01) |
| *G11C 16/08* | (2006.01) |
| *H10B 41/27* | (2023.01) |
| *H10B 41/40* | (2023.01) |
| *H10B 43/27* | (2023.01) |
| *H10B 43/40* | (2023.01) |

(52) U.S. Cl.
CPC .............. *G11C 5/06* (2013.01); *G11C 16/08* (2013.01); *H10B 41/27* (2023.02); *H10B 41/40* (2023.02); *H10B 43/27* (2023.02); *H10B 43/40* (2023.02)

(58) Field of Classification Search
CPC ....... G11C 5/025; G11C 5/06; G11C 16/0483; G11C 5/063; G11C 13/00; G11C 13/0002; G11C 13/0026; G11C 13/0028; G11C 2213/71; G11C 16/08; H10B 10/12; H10B 43/27; H10B 41/27; H10B 43/50; H10B 43/10; H10B 41/50; H10B 43/35; H10B 43/40; H10B 12/0335; H10B 41/20; H10B 41/35; H10B 10/125; H10B 10/15; H10B 41/10; H10B 43/20; H10B 12/01; H10B 12/09; H10B 12/312; H10B 12/315; H10B 12/34; H10B 12/482; H10B 12/485; H10B 12/488; H10B 43/30; H10B 63/20; H10B 63/34; H10B 63/845; H10B 12/50; H10B 41/23; H10B 41/40

See application file for complete search history.

(56) References Cited

U.S. PATENT DOCUMENTS 9,640,549 B2 * 5/2017 Lee .......................... G11C 8/14
10,373,970 B2 8/2019 Lee

FOREIGN PATENT DOCUMENTS

KR 10-2020-0132570 A 11/2020

\* cited by examiner

*Primary Examiner* — Thong Q Le
(74) *Attorney, Agent, or Firm* — IP & T GROUP LLP

(57) ABSTRACT

A semiconductor device may include: a first gate structure including first gate lines, a first step structure including first pads, a first gap-fill insulating layer located between the first gate lines and the first step structure, and first wiring lines connecting the first gate lines and the first pads, respectively; and a second gate structure including second gate lines located on the first gate lines, a second step structure located on the first gap-fill insulating layer and including second pads, a second gap-fill insulating layer located on the first step structure, and second wiring lines connecting the second gate lines and the second pads, respectively.

20 Claims, 31 Drawing Sheets

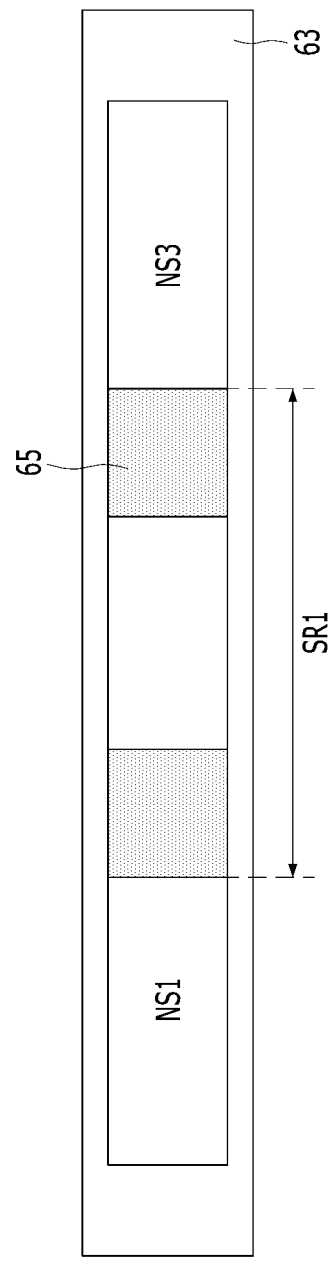

SEMICONDUCTOR DEVICE AND MANUFACTURING METHOD OF A SEMICONDUCTOR DEVICE

CROSS-REFERENCE TO RELATED APPLICATION

This application claims priority under 35 U.S.C. § 119 to Korean Patent Application No. 10-2023-0062767 filed on May 16, 2023, which is incorporated herein by reference in its entirety.

BACKGROUND

1. Technical Field

Embodiments of the present invention disclosure relate to an electronic device, and more particularly, to a semiconductor device and a manufacturing method of the semiconductor device.

2. Related Art

The degree of integration of a semiconductor device is mainly determined by an area occupied by a unit memory cell. Recently, as the improvement in the degree of integration of a semiconductor device for forming memory cells in a single layer on a substrate reaches a limit, a three-dimensional semiconductor device for stacking memory cells on a substrate has been proposed. Furthermore, in order to improve the operational reliability of such a semiconductor device, various structures and manufacturing methods have been developed.

SUMMARY

In an embodiment, a semiconductor device may include: a first gate structure including first gate lines, a first step structure including first pads, a first gap-fill insulating layer located between the first gate lines and the first step structure, and first wiring lines connecting the first gate lines and the first pads, respectively; and a second gate structure including second gate lines located over the first gate lines, a second step structure located on the first gap-fill insulating layer and including second pads, a second gap-fill insulating layer located on the first step structure, and second wiring lines connecting the second gate lines and the second pads, respectively.

In an embodiment, a semiconductor device may include: stacked first gate lines; a first step structure including first pads connected to the first gate lines; a first gap-fill insulating layer located between the first gate lines and the first step structure; stacked second gate lines; a second step structure including second pads connected to the second gate lines; a channel structure extending through the first gate lines and the second gate lines; and a support extending through the second step structure and the first gap-fill insulating layer.

In an embodiment, a manufacturing method of a semiconductor device may include: forming a first stack; forming a first step structure in the first stack; forming a first gap-fill insulating layer in the first stack; forming a second stack on the first stack; forming, in the second stack, a second step structure located on the first gap-fill insulating layer; and forming a support extending through the second step structure and the first gap-fill insulating layer.

In an embodiment, a manufacturing method of a semiconductor device may include: forming a first stack including a first cell region, a second cell region, a step region located between the first cell region and the second cell region, a first non-step region located between the first cell region and the step region, and a wiring region connecting the step region to the first cell region and the second cell region in common; forming a first step structure in the step region; forming a first gap-fill insulating layer in the first non-step region; forming a second stack on the first stack; forming, in the second stack, a second step structure located on the first gap-fill insulating layer; and forming a first support extending through the second step structure and the first gap-fill insulating layer.

These and other features and advantages of the present invention will be better understood by the skilled person from the following drawings and detailed description of various embodiments of the invention.

BRIEF DESCRIPTION OF THE DRAWINGS

FIGS. 6A, 7A, 8A, 9A, 10A, 11A, 12A, 13A, 14A, 15A, and 16A and FIGS. 6B, 7B, 8B, 9B, 10B, 11B, 12B, 13B, 14B, 15B, and 16B are diagrams for describing a manufacturing method of a semiconductor device in accordance with an embodiment.

DETAILED DESCRIPTION

Various embodiments are directed to a semiconductor device having a stable structure and improved characteristics and a manufacturing method of the semiconductor device.

By stacking memory cells in three dimensions, it is possible to improve the degree of integration of a semiconductor device. It is also possible to provide a semiconductor device having a stable structure and improved reliability.

Hereafter, embodiments in accordance with the technical spirit of the present invention disclosure will be described with reference to the accompanying drawings.

Figure 1A:
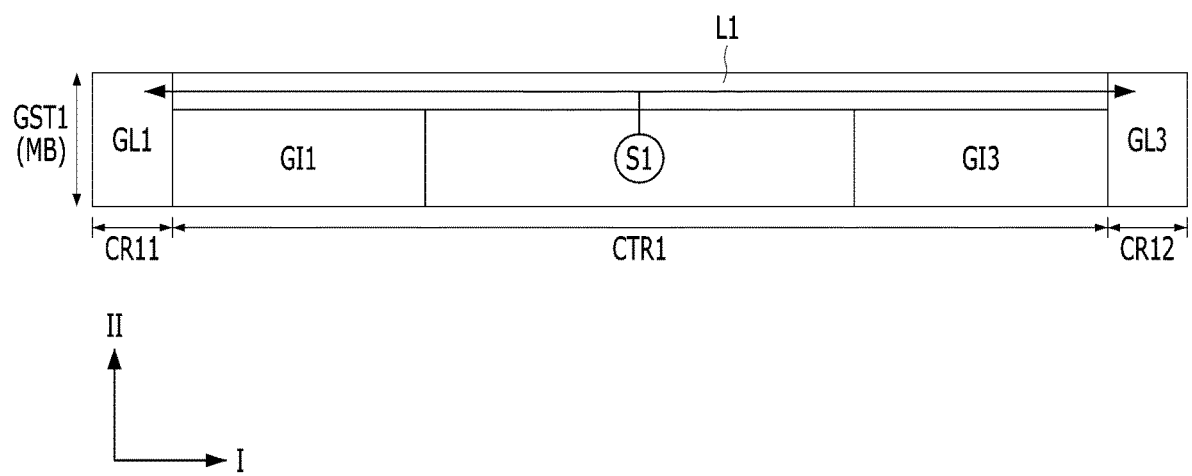
FIGS. 1A to 1C are diagrams illustrating the structure of a semiconductor device in accordance with an embodiment.
Figure 1B:
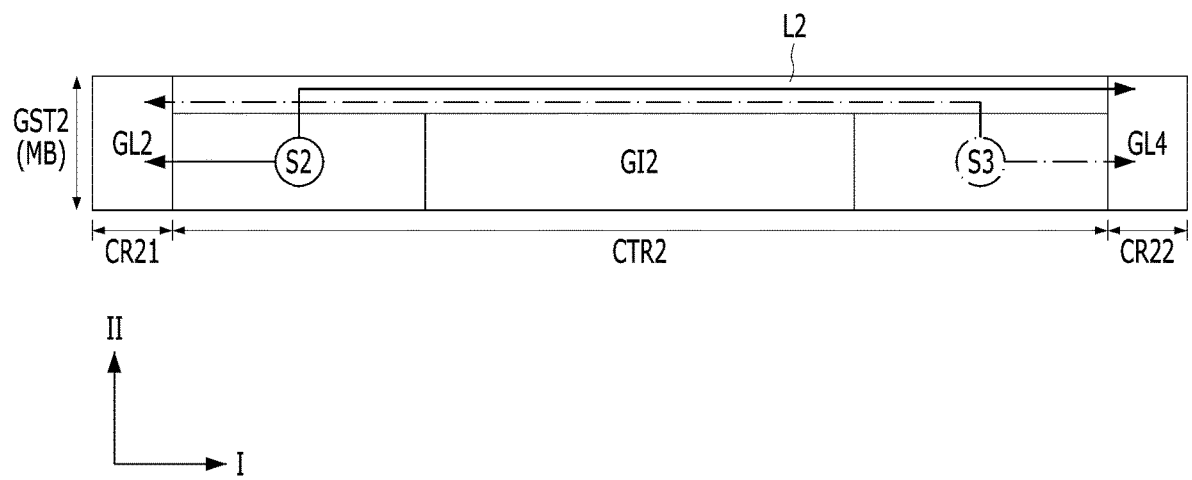
Figure 1C:
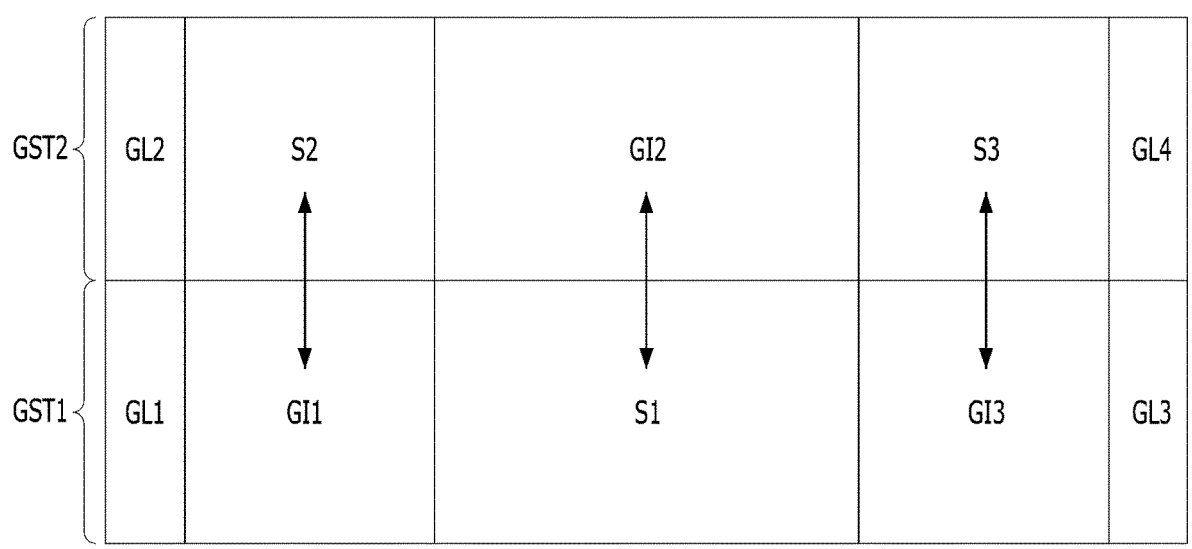
Figure 1C:
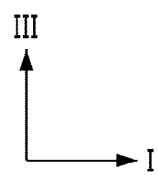

FIGS. 1A to 1C are diagrams illustrating the structure of a semiconductor device in accordance with an embodiment. FIG. 1A illustrates a planar layout of a first gate structure GST1, FIG. 1B illustrates a planar layout of a second gate structure GST2, and FIG. 1C illustrates cross-sectional layouts of the first gate structure GST1 and the second gate structure GST2.

Referring to FIGS. 1A and 1C, the semiconductor device may include the first gate structure GST1. The first gate structure GST1 may include a first cell region CR11, a second cell region CR12, and a first contact region CTR1. The first contact region CTR1 may be located between the first cell region CR11 and the second cell region CR12 along a first direction I. The first and second cell regions CR11 and CR12 may be regions where memory cells are located. The memory cells may be stacked in a three-dimensional arrangement. The first contact region CTR1 may be a region where an interconnection structure is located. A bias for driving a cell array may be transmitted through the interconnection structure. The interconnection structure may include contact plugs, wiring lines, and the like.

The first gate structure GST1 may include first gate lines GL1, a first step structure S1, a first gap-fill insulating layer GI1, and first connection wiring lines L1. The first gate lines GL1 and the first step structure S1 may be adjacent to each other in the first direction I, and the first gap-fill insulating layer GI1 may be located between the first gate lines GL1 and the first step structure S1. The first step structure S1 and the first connection wiring lines L1 may be adjacent to each other in a second direction II, and the first connection wiring lines L1 may extend in the first direction I. The second direction II may be orthogonal to the first direction I. Accordingly, even when the first gap-fill insulating layer GI1 is located between the first gate lines GL1 and the first step structure S1, the first step structure S1 and the first gate lines GL1 may be electrically connected to each other by the first connection wiring line L1 extending along sidewalls of the first step structure S1 and sidewalls of the first gap-fill insulating layer GI1.

The first gate structure GST1 may further include at least one of a third gate line GL3 and a third gap-fill insulating layer GI3. The first gate lines GL1 and the third gate lines GL3 may be positioned along the first direction I. The third gap-fill insulating layer GI3 may be located between the third gate lines GL3 and the first step structure S1. Even when the third gap-fill insulating layer GI3 is located between the third gate lines GL3 and the first step structure S1, the first step structure S1 and the third gate lines GL3 may be electrically connected to each other by the first connection wiring line L1 extending along the sidewalls of the first step structure S1 and sidewalls of the third gap-fill insulating layer GI3. Accordingly, the first step structure S1 may be connected in common to the first gate line GL1 and the third gate line GL3 through the first connection wiring line L1.

The first gate lines GL1 may be located in the first cell region CR11, and the third gate lines GL3 may be located in the second cell region CR12. The first step structure S1, the first connection wiring lines L1, the first gap-fill insulating layer GI1, and the third gap-fill insulating layer GI3 may be located in the first contact region CTR1.

The first cell region CR11 and the second cell region CR12 may belong to the same memory block MB. The memory block MB may be a unit of an erase operation. The first gate lines GL1 and the third gate lines GL3 may belong to the same memory block MB, and may be interconnected through the first connection wiring line L1. Accordingly, a bias applied through the first step structure S1 may be transmitted to the first gate lines GL1 and the third gate lines GL3 through the first connection wiring line L1. For example, the first step structure S1 may be connected to a row decoder, and the first gate lines GL1 and the third gate lines GL3 may be controlled by the same row decoder.

Referring to FIGS. 1B and 1C, the semiconductor device may include a second gate structure GST2. The second gate structure GST2 may include a first cell region CR21, a second cell region CR22, and a second contact region CTR2. The second contact region CTR2 may be located between the first cell region CR21 and the second cell region CR22.

The first gate structure GST1 and the second gate structure GST2 may be stacked in the third direction III. The third direction III may be a direction orthogonal to a plane defined by the first and second directions I and II. The second gate structure GST2 may include second gate lines GL2, a second step structure S2, a second gap-fill insulating layer GI2, and second connection wiring lines L2. The second gate structure GST2 may further include at least one of a fourth gate line GL4 and a third step structure S3. The second gap-fill insulating layer GI2 may be located between the second step structure S2 and the third step structure S3.

The second step structure S2 and the first gap-fill insulating layer GI1 may be stacked in the third direction III. The first step structure S1 and the second gap-fill insulating layer GI2 may be stacked in the third direction III. The third step structure S3 and the third gap-fill insulating layer GI3 may be stacked in the third direction III.

The second step structure S2 may be connected to the second gate lines GL2. The third step structure S3 may be connected to the fourth gate lines GL4. The second connection wiring lines L2 may be adjacent to the second step structure S2 and the third step structure S3 in the second direction II and may extend in the first direction I. Accordingly, the second step structure S2 and the third step structure S3 may be connected in common to the second gate lines GL2 and the fourth gate lines GL4 through the second connection wiring lines L2.

Even when the third gap-fill insulating layer GI3 is located between the third gate lines GL3 and the first step structure S1, the first step structure S1 and the third gate lines GL3 may be electrically connected to each other by the first connection wiring line L1 extending along the sidewalls of the first step structure S1 and the sidewalls of the third gap-fill insulating layer GI3.

The second gate lines GL2 and the fourth gate lines GL4 may belong to the same memory block MB and may be connected to each other through the second connection wiring line L2. Accordingly, a bias applied to the second step structure S2 may be transmitted to the second gate lines GL2 and the fourth gate lines GL4 through the second connection wiring line L2. For example, the second step structure S2 may be connected to the row decoder, and the second gate lines GL2 and the fourth gate lines GL4 may be controlled by the same row decoder.

According to the structure described above, the first and second contact regions CTR1 and CTR2 may be located between the first cell regions CR11 and CR21 and the second cell regions CR12 and CR22. Accordingly, the first cell regions CR11 and CR21 and the second cell regions CR12 and CR22 may be connected in common to the first to third step structures S1 to S3 and share a peripheral circuit such as a row decoder. Accordingly, a bias may be applied in both directions, and the RC delay of the gate lines GL1 to GL4 may be reduced.

The second gate lines GL2 may be stacked over the first gate lines GL1, and the first to third step structures S1 to S3 may be distributedly disposed in the first and second contact regions CTR1 and CTR2. Accordingly, as the number of stacked gate lines GL1 to GL4 increases, an area of the contact region CTR may increase, and the capacitance between the stacked gate lines GL1 to GL4 may increase. Also, due to the nature of the step structure, the first gate lines GL1 located below may have higher capacitance than the second gate lines GL2 located above, and a program speed may decrease. Accordingly, a portion of the first contact region CTR1 with no first step structure S1 may be replaced with the first gap-fill insulating layer GI1. Through this, capacitance caused in the first contact region CTR1 may be reduced, an RC delay difference may be reduced, and a program speed may be improved.

Figure 2A:
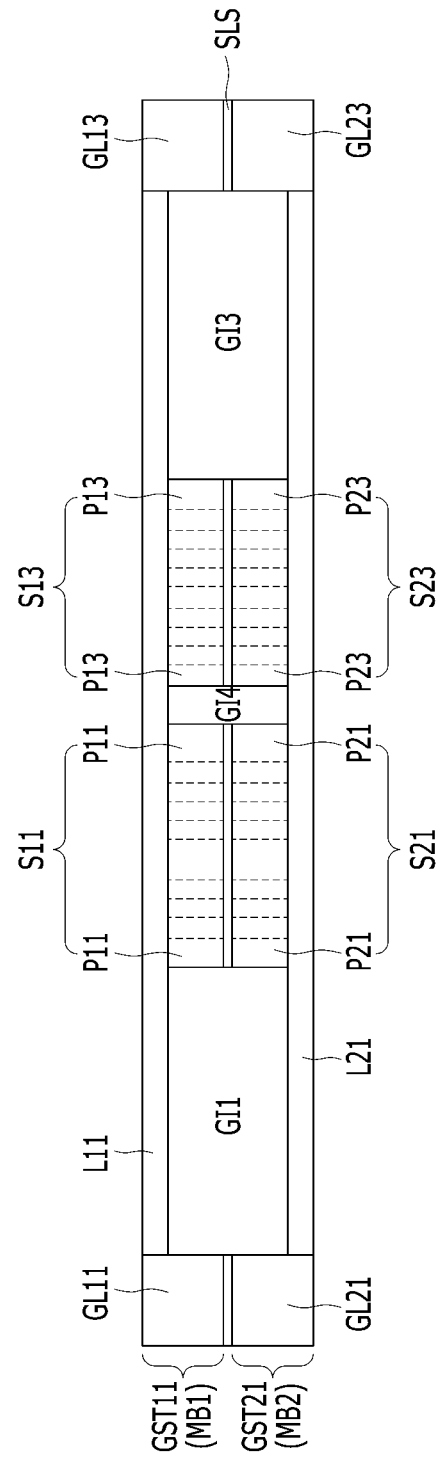
FIGS. 2A, 2B, 3A, and 3B are diagrams illustrating the structure of a semiconductor device in accordance with an embodiment.
Figure 2B:
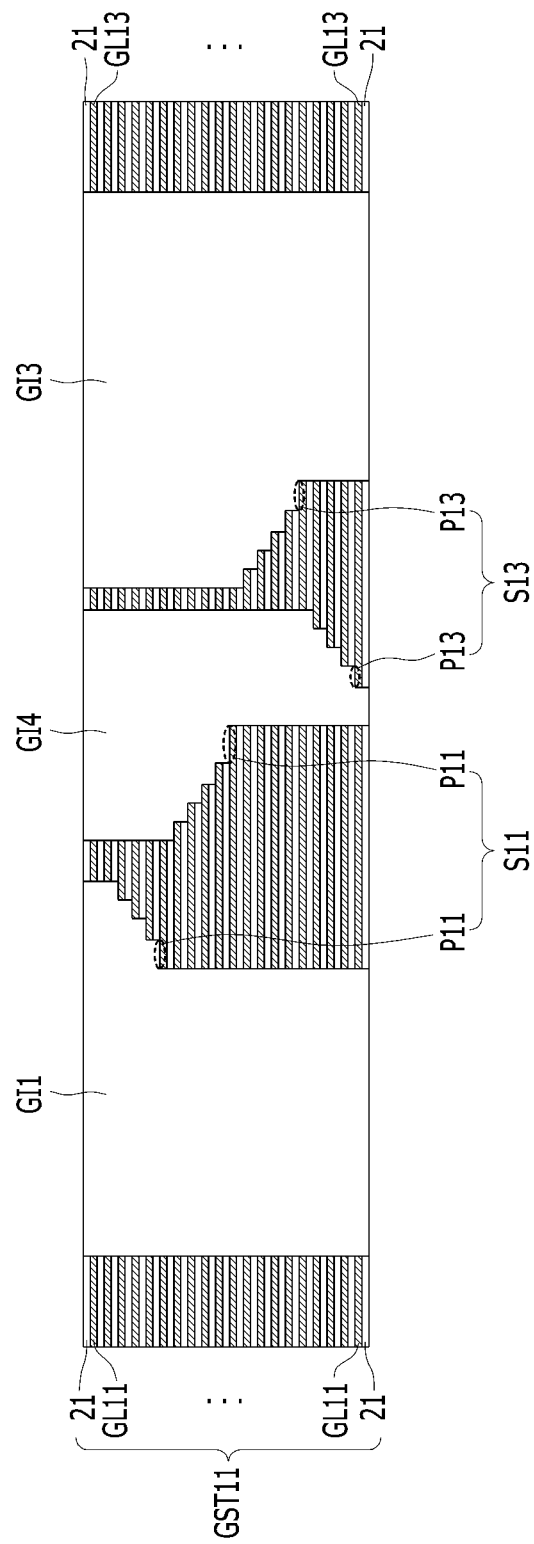
Figure 3A:
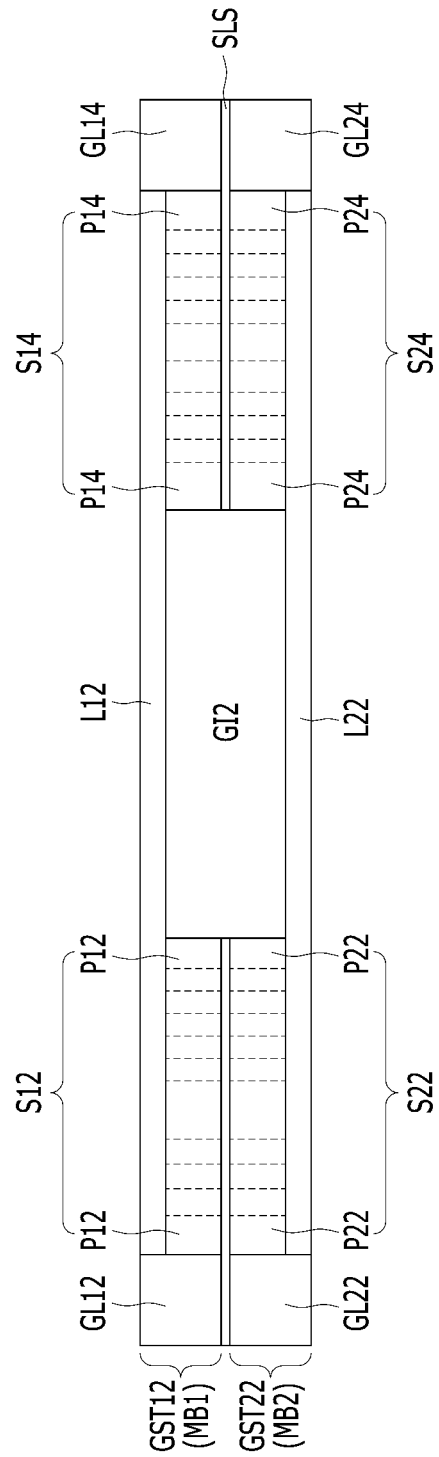

FIGS. 2A, 2B, 3A, and 3B are diagrams illustrating the structure of a semiconductor device in accordance with an embodiment. FIG. 2A may be a plan view of a first gate structure GST11, and FIG. 2B may be a cross-sectional view of the first gate structure GST11. FIG. 3A may be a plan view of a second gate structure GST12, and FIG. 3B may be a cross-sectional view of the second gate structure GST12. Hereinafter, the content overlapping with the previously described content will be omitted.

Referring to FIGS. 2A and 2B, the first gate structure GST11 may include first gate lines GL11. For example, the first gate structure GST11 may include the first gate lines GL11 and first insulating layers 21 that are alternately stacked. The first gate lines GL11 may be word lines, source select lines, or drain select lines. The first gate lines GL11 may each include polysilicon, tungsten (W), molybdenum (Mo), or the like.

The first gate structure GST11 may include a first step structure S11. The first step structure S11 may include first pads P11 stacked in a step shape. Each of the first pads P11 may be exposed by the first step structure S11. The first pads P11 may be connected to the first gate lines GL11 through first wiring lines L11, respectively.

A first gap-fill insulating layer GI1 may be located between the first gate lines GL11 and the first step structure S11. The first gap-fill insulating layer GI1 may include a material with a lower dielectric constant than that of the first gate lines GL11. For example, the first gap-fill insulating layer GI1 may include an insulating material such as oxide, nitride, or air gap. A step surface of the first step structure S11 may be covered by the first gap-fill insulating layer GI1. The first wiring lines L11 may extend along sidewalls of the first gap-fill insulating layer GI1 and sidewalls of the first step structure S11.

The first gate structure GST11 may include third gate lines GL13. For example, the first gate structure GST11 may include the third gate lines GL13 and first insulating layers 21 that are alternately stacked. The third gate lines GL13 may be word lines, source select lines, or drain select lines. The third gate lines GL13 may each include polysilicon, tungsten (W), molybdenum (Mo), or the like.

A third step structure S13 may be located between the first step structure S11 and the third gate lines GL13. The third step structure S13 may include third pads P13 stacked in a step shape. Each of the third pads P13 may be exposed by the third step structure S13. The third pads P13 may be connected to the third gate lines GL13 through the first wiring lines L11, respectively.

A third gap-fill insulating layer GI3 may be located between the third gate lines GL13 and the third step structure S13. The third gap-fill insulating layer GI3 may include a material with a lower dielectric constant than the third gate lines GL13. For example, the third gap-fill insulating layer GI3 may include an insulating material such as oxide, nitride, or air gap. A step surface of the third step structure S13 may be covered by the third gap-fill insulating layer GI3.

A fourth gap-fill insulating layer GI4 may be located between the first gate structure GST11 and the third step structure S13. The step surface of the first step structure S11 and the step surface of the third step structure S13 may be covered by the fourth gap-fill insulating layer GI4. The first wiring lines L11 may extend along the fourth gap-fill insulating layer GI4, the sidewalls of the third step structure S13, and the sidewalls of the third gap-fill insulating layer GI3.

For example, the first gate structure GST11 may include the gate lines GL11 and the third gate lines GL13, and may belong to a first memory block MB1. The first pad P11 may be connected in common to the first gate line GL11 and the third gate line GL13 through the first wiring line L11. The third pad P13 may be connected in common to the first gate line GL11 and the third gate line GL13 through the first wiring line L11.

A first gate structure GST21 may belong to a second memory block MB2. The first gate structure GST21 may have a structure similar to that of the first gate structure GST11. The first gate structure GST21 may include a first gate line GL21, a first step structure S21, a third gate line GL23, a third step structure S23, a first wiring line L21, the first gap-fill insulating layer GI1, the third gap-fill insulating layer GI3, and the fourth gap-fill insulating layer GI4, or a combination thereof.

The first step structure S21 may include first pads P21, and the third step structure S23 may include third pads P23. The first wiring line L11 and the first wiring line L21 may face each other with the first gap-fill insulating layer GI1, the third gap-fill insulating layer GI3, and the fourth gap-fill insulating layer GI4 interposed therebetween. A slit structure SLS may be located between the first gate structure GST11 and the first gate structure GST21. The first gate structure GST11 and the first gate structure GST21 may be electrically isolated from each other by the slit structure SLS.

The first pad P21 may be connected in common to the first gate line GL21 and the third gate line GL23 through the first wiring line L21. The third pad P23 may be connected in common to the first gate line GL21 and the third gate line GL23 through the first wiring line L21.

Figure 3B:
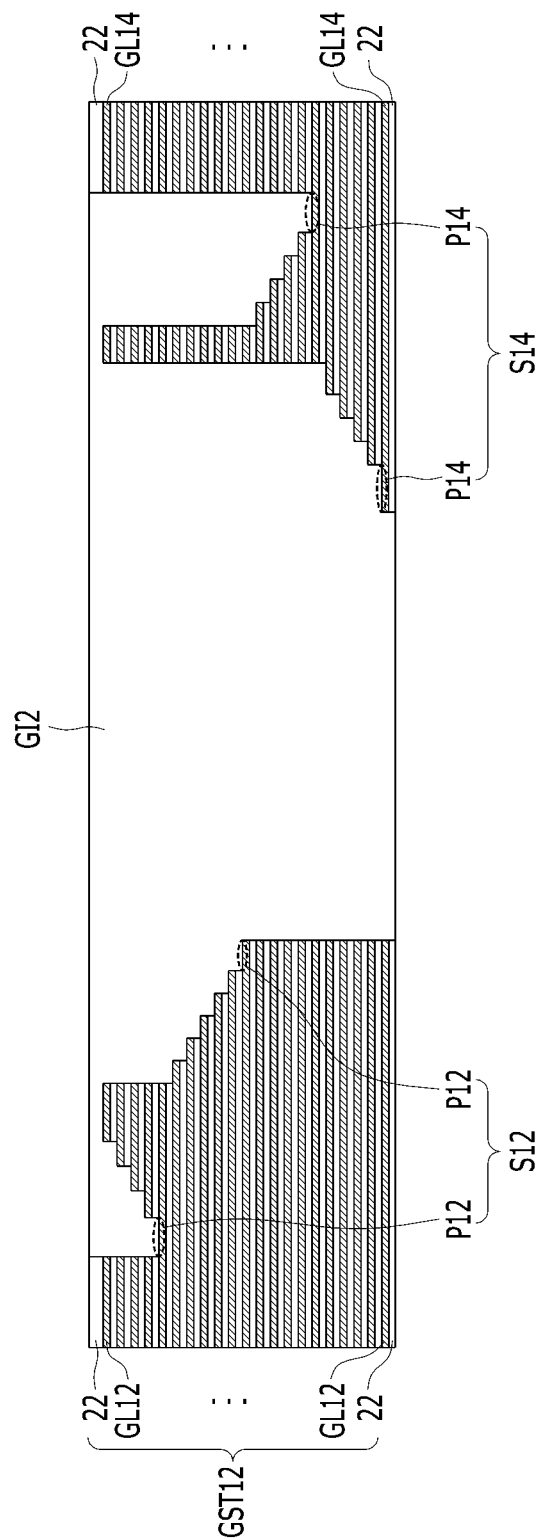

Referring to FIGS. 3A and 3B, the second gate structure GST12 may include second gate lines GL12. For example, the second gate structure GST12 may include the second gate lines GL12 and second insulating layers 22 that are alternately stacked. The second gate structure GST12 may be located on the first gate structure GST11. The second gate lines GL12 may be word lines, source select lines, or drain select lines. The second gate lines GL12 may each include polysilicon, tungsten (W), molybdenum (Mo), or the like.

The second gate structure GST12 may include a second step structure S12 located on the first gap-fill insulating layer GI1. The second step structure S12 may include second pads P12 stacked in a step shape. Each of the second pads P12 may be exposed by the second step structure S12. The second pads P12 may be connected to the second gate lines GL12, respectively.

A second gap-fill insulating layer GI2 may be located on the first step structure S11, the third step structure S13, and the fourth gap-fill insulating layer GI4. The second gap-fill insulating layer GI2 may include a material with a lower dielectric constant than that of the second gate lines GL12. For example, the second gap-fill insulating layer GI2 may include an insulating material such as oxide, nitride, or air gap.

The second gate structure GST12 may include fourth gate lines GL14. For example, the second gate structure GST12 may include the fourth gate lines GL14 and second insulating layers 22 that are alternately stacked. The fourth gate lines GL14 may be located over the third gate lines GL13. The fourth gate lines GL14 may be word lines, source select lines, or drain select lines. The fourth gate lines GL14 may each include polysilicon, tungsten (W), molybdenum (Mo), or the like.

The second pads P12 may be connected to the fourth gate lines GL14 through second wiring lines L12, respectively. The second wiring line L12 may extend along sidewalls of the second step structure S12, sidewalls of the second gap-fill insulating layer GI2, and sidewalls of a fourth step structure S14. Accordingly, the second pad P12 may be connected in common to the second gate line GL12 and the fourth gate line GL14.

The fourth step structure S14 may be located between the fourth gate lines GL14 and the second gap-fill insulating layer GI2. The fourth step structure S14 may include fourth pads P14 stacked in a step shape. Each of the fourth pads P14 may be exposed by the fourth step structure S14. The fourth pads P14 may be connected to the fourth gate lines GL14, respectively.

The fourth pads P14 may be connected to the second gate lines GL12 through the second wiring lines L12, respectively. Accordingly, the fourth pad P14 may be connected in common to the second gate line GL12 and the fourth gate line GL14. A step surface of the second step structure S12 and a step surface of the fourth step structure S14 may be covered by the second gap-fill insulating layer GI2.

A second gate structure GST22 may belong to the second memory block MB2. The second gate structure GST22 may have a structure similar to that of the second gate structure GST12. The second gate structure GST22 may include a second gate line GL22, a second step structure S22, a fourth gate line GL24, a fourth step structure S24, a second wiring line L22, and a second gap-fill insulating layer GI2, or a combination thereof.

The second step structure S22 may include second pads P22, and the fourth step structure S24 may include fourth pads P24. The second wiring line L12 and the second wiring line L22 may face each other with the second gap-fill insulating layer GI2 interposed therebetween. A slit structure SLS may be located between the second gate structure GST12 and the second gate structure GST22. The second gate structure GST12 and the second gate structure GST22 may be electrically isolated from each other by the slit structure SLS.

The second pad P22 may be connected in common to the second gate line GL22 and the fourth gate line GL24. The fourth pad P24 may be connected in common to the second gate line GL22 and the fourth gate line GL24.

According to the structure described above, the first gap-fill insulating layer GI1 may be located below the second step structures S12 and S22. The second gap-fill insulating layer GI2 may be located above the first step structures S11 and S21 and the third step structures S13 and S23. The third gap-fill insulating layer GI3 may be located below the fourth step structures S14 and S24. Through this, parasitic capacitance may be reduced, RC delay may be reduced, and a program speed may be improved.

Figure 4:
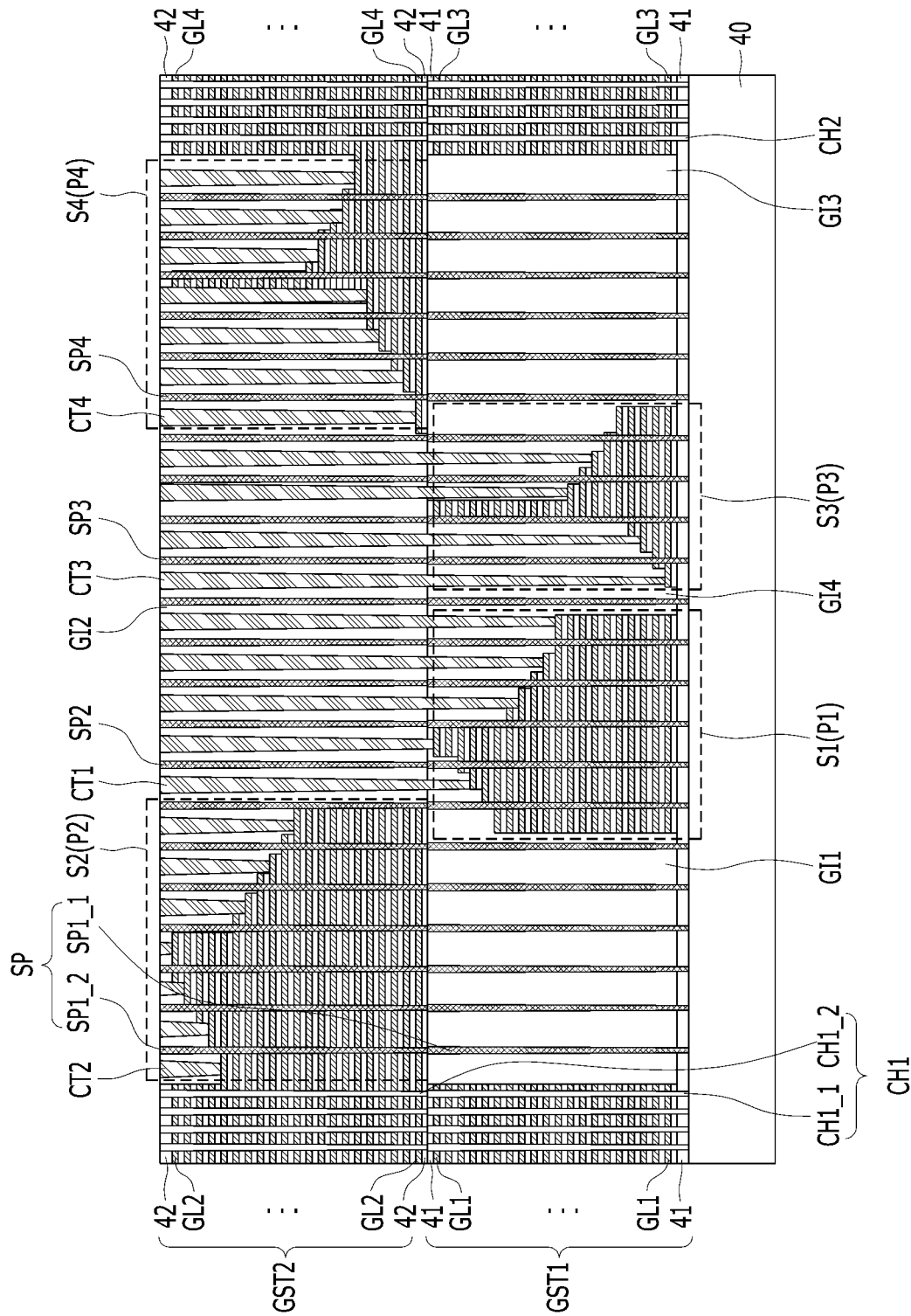
FIG. 4 is a diagram illustrating the structure of a semiconductor device in accordance with an embodiment.

FIG. 4 is a diagram illustrating the structure of a semiconductor device in accordance with an embodiment. Hereinafter, content overlapping with previously described content may be omitted.

Referring to FIG. 4, the semiconductor device may include first and second gate structures GST1 and GST2 stacked over a base 40. The semiconductor device may further include first channel structures CH1, second channel structures CH2, first supports SP1, second supports SP2, third supports SP3, fourth supports SP4, first contact plugs CT1, second contact plugs CT2, third contact plugs CT3, or fourth contact plugs CT4, or a combination thereof.

The base 40 may include a substrate, a source structure, a peripheral circuit, an interconnection structure, or the like, or a combination thereof. For example, a source region may be included in the substrate, or the source structure may be located between the substrate and the first gate structure GST1. For example, the base 40 may include a substrate, a peripheral circuit located on the substrate, and an interconnection structure connected to the peripheral circuit, and the peripheral circuit may be located below the first gate structure GST1.

The first gate structure GST1 may include first gate lines GL1 and first insulating layers 41 that are alternately stacked. The first gate structure GST1 may include a first step structure S1, and a first gap-fill insulating layer GI1 may be located between the first gate lines GL1 and the first step structure S1. The first step structure S1 may include first pads P1 stacked in a step shape. The first contact plugs CT1 may extend through a second gap-fill insulating layer GI2, and may be connected to the first pads P1, respectively.

The second gate structure GST2 may include second gate lines GL2 and second insulating layers 42 that are alternately stacked. The second gate structure GST2 may include a second step structure S2 located on the first gap-fill insulating layer GI1. The second gap-fill insulating layer GI2 may be located on the first step structure S1. The second step structure S2 may include second pads P2 stacked in a step shape. The second contact plugs CT2 may extend through the second gap-fill insulating layer GI2 or may extend through the second gap-fill insulating layer GI2 and a fourth gap-fill insulating layer GI4. The second contact plugs CT2 may be connected to the second pads P2, respectively.

The first channel structures CH1 may extend through the second gate structure GST2 and the first gate structure GST1. Memory cells may be located in regions where the first channel structures CH1, first gate lines GL1, and second gate lines GL2 intersect one another. Memory cells stacked along the first channel structures CH1 may constitute one memory string.

The first channel structure CH1 may include a first sub-channel structure CH1_1 and a second sub-channel structure CH1_2. The first sub-channel structure CH1_1 may extend through the first gate lines GL1. The second sub-channel structure CH2_2 may extend through the second gate line GL2 and be connected to the first sub-channel structure CH1_1.

The first supports SP1 may extend through the second step structure S2 and the first gap-fill insulating layer GI1. The first support SP1 may include a first sub-support SP1_1 and a second sub-support SP1_2. The first sub-support SP1_1 may extend through the first gap-fill insulating layer GI1. The second sub-support SP1_2 may extend through the second step structure S2 and be connected to the first sub-support SP1_1.

The second supports SP2 may extend through the first step structure S1 and the second gap-fill insulating layer GI2, may extend through the first step structure S1, the first gap-fill insulating layer GI1, and the second gap-fill insulating layer GI2, or may extend through the first step structure S1, the fourth gap-fill insulating layer GI4, and the second gap-fill insulating layer GI2. Like the first support SP1, the second support SP2 may include a first sub-support and a second sub-support.

The first gate structure GST1 may include third gate lines GL3 and the first insulating layers 41 that are alternately stacked. A third step structure S3 may be located between the first step structure S1 and the third gate lines GL3. A third gap-fill insulating layer GI3 may be located between the third gate lines GL3 and the third step structure S3. The fourth gap-fill insulating layer GI4 may be located between the first step structure S1 and the third step structure S3. The third step structure S3 may include third pads P3 stacked in a step shape. The third contact plugs CT3 may extend through the second gap-fill insulating layer GI2 and the fourth gap-fill insulating layer GI4, and may be connected to the third pads P3, respectively.

The second gate structure GST2 may include fourth gate lines GL4 and the second insulating layers 42 that are alternately stacked. The fourth gate lines GL4 may be located over the third gate lines GL3. A fourth step structure S4 may be located between the fourth gate lines GL4 and the second gap-fill insulating layer GI2. The fourth step structure S4 may include fourth pads P4 stacked in a step shape. The fourth contact plugs CT4 may extend through the second gap-fill insulating layer GI2, and may be connected to the fourth pads P4, respectively.

The second channel structures CH2 may extend through the third gate lines GL3 and the fourth gate lines GL4. The third supports SP3 may extend through the third step structure S3 and the second gap-fill insulating layer GI2, or may extend through the third step structure S3, the fourth gap-fill insulating layer GI4, and the second gap-fill insulating layer GI2. The fourth supports SP4 may extend through the fourth step structure S4 and the third gap-fill insulating layer GI3, or may extend through the second gap-fill insulating layer GI2, the fourth step structure S4, and the third gap-fill insulating layer GI3.

According to the structure described above, the first gap-fill insulating layer GI1 may be located below the second step structure S2. The second gap-fill insulating layer GI2 may be located above the first step structure S1 and the third step structure S3. The third gap-fill insulating layer GI3 may be located below the fourth step structure S4. Through this, parasitic capacitance may be reduced, RC delay may be reduced, and a program speed may be improved.

Figure 5:
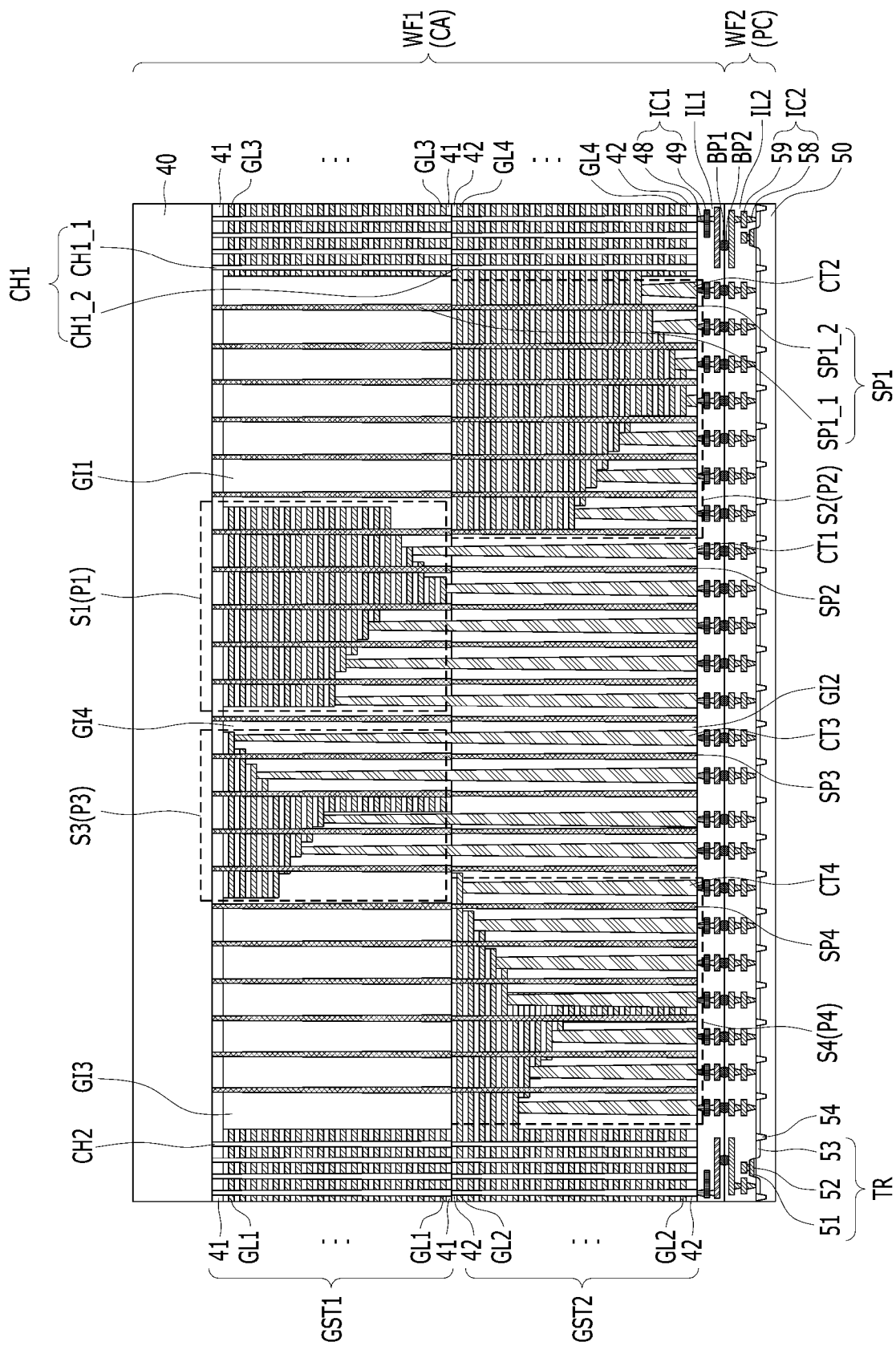
FIG. 5 is a diagram illustrating the structure of a semiconductor device in accordance with an embodiment.

FIG. 5 is a diagram illustrating the structure of a semiconductor device in accordance with an embodiment. Hereinafter, the content overlapping with the previously described content will be omitted.

Referring to FIG. 5, the semiconductor device may include a first wafer WF1 and a second wafer WF2. The first wafer WF1 may include a cell array CA, and the second wafer WF2 may include a peripheral circuit PC for driving the cell array CA. The first wafer WF1 and the second wafer WF2 may be electrically connected to each other through a first bonding pad BP1 and a second bonding pad BP2. At least one of the first wafer WF1 and the second wafer WF2 may include no substrate. For example, after the first wafer WF1 and the second wafer WF2 are bonded to each other, a substrate in the first wafer WF1 may be removed.

The semiconductor device may include a first gate structure GST1, a second gate structure GST2, first channel structures CH1, second channel structures CH2, a first support SP1, a second support SP2, a third support SP3, a fourth support SP4, a first contact plug CT1, a second contact plug CT2, a third contact plug CT3, and a fourth contact plug CT4, or a combination thereof.

The semiconductor device may further include a first interlayer dielectric layer IL1, a first interconnection structure IC1, the first bonding pad BP1, a substrate 50, an isolation layer 54, a transistor TR, a second interlayer dielectric layer IL2, a second interconnection structure IC2, and the second bonding pad BP2, or a combination thereof. The first gate structure GST1, the second gate structure GST2, the first channel structure CH1, the second channel structure CH2, the first support SP1, the second support SP2, the third support SP3, the fourth support SP4, the first contact plug CT1, the second contact plug CT2, the third contact plug CT3, the fourth contact plug CT4, the first interlayer dielectric layer IL1, the first interconnection structure IC1, and the first bonding pad BP1 may belong to the first wafer WF1. The substrate 50, the isolation layer 54, the transistor TR, the second interlayer dielectric layer IL2, the second interconnection structure IC2, and the second bonding pad BP2 may belong to the second wafer WF2.

The first gate structure GST1 may include a first step structure S1 and a third step structure S3 in an inverted step shape. The second gate structure GST2 may be located below the first gate structure GST1, and may include a second step structure S2 and a fourth step structure S4 in an inverted step shape.

The second step structure S2 may be located below a first gap-fill insulating layer GI1. A second gap-fill insulating layer GI2 may be located below the first step structure S1 and the third step structure S3. The fourth step structure S4 may be located below a third gap-fill insulating layer GI3. Through this, parasitic capacitance among gate lines GL1 to GL4 may be reduced.

The first channel structures CH1 and the second channel structures CH2 may extend into a source structure included in the base 40 through the first gate structure GST1 and the second gate structure GST2. Each of the first channel structures CH1 and the second channel structures CH2 may include a channel layer, a memory layer, and an insulating core, or a combination thereof. The memory layer may include a tunneling layer, a data storage layer, or a blocking layer, or a combination thereof. The data storage layer may include a floating gate, polysilicon, a charge trap material, nitride, a variable resistance material, and the like, or a combination thereof.

The first interconnection structure IC1 may be electrically connected to the first channel structure CH1, the second channel structure CH2, the first contact plug CT1, the second contact plug CT2, the third contact plug CT3, or the fourth contact plug CT4. The first interconnection structure IC1 may be located in the first interlayer dielectric layer IL1, and may include vias 48, wiring lines 49 and the like.

The isolation layer 54 may be located in the substrate 50, and the transistor TR may be located in an active region defined by the isolation layer 54. The transistor TR may include a gate insulating layer 51, a gate electrode 52, and a junction 53. The transistor TR may belong to a peripheral circuit PC. For example, the peripheral circuit PC may include a row decoder, a page buffer, and the like. The page buffer may be located to face the first channel structures CH1 and the second channel structures CH2. The row decoder may be located to face at least one of the first to fourth step structures S1 to S4. The second interconnection structure IC2 may be electrically connected to the peripheral circuit PC. The second interconnection structure IC2 may be located in the second interlayer dielectric layer IL2, and may include vias 58, wiring lines 59, and the like.

According to the structure described above, the cell array CA and the peripheral circuit PC may be distributedly disposed on the first wafer WF1 and the second wafer WF2. Accordingly, the degree of integration of the semiconductor device may be improved. By locating the gap-fill insulating layers GI1 to GI4 in the gate structures GST1 and GST2, parasitic capacitance among the gate lines GL1 to GL4 may be reduced.

FIGS. 6A, 7A, 8A, 9A, 10A, 11A, 12A, 13A, 14A, 15A, and 16A and FIGS. 6B, 7B, 8B, 9B, 10B, 11B, 12B, 13B, 14B, 15B, and 16B are diagrams for describing a manufacturing method of a semiconductor device in accordance with an embodiment. FIGS. 6A, 7A, 8A, 9A, 10A, 11A, 12A, 13A, 14A, 15A, and 16A are plan views, respectively, and FIGS. 6B, 7B, 8B, 9B, 10B, 11B, 12B, 13B, 14B, 15B, and 16B are cross-sectional views, respectively. Hereinafter, the content overlapping with the previously described content will be omitted.

Figure 6A:
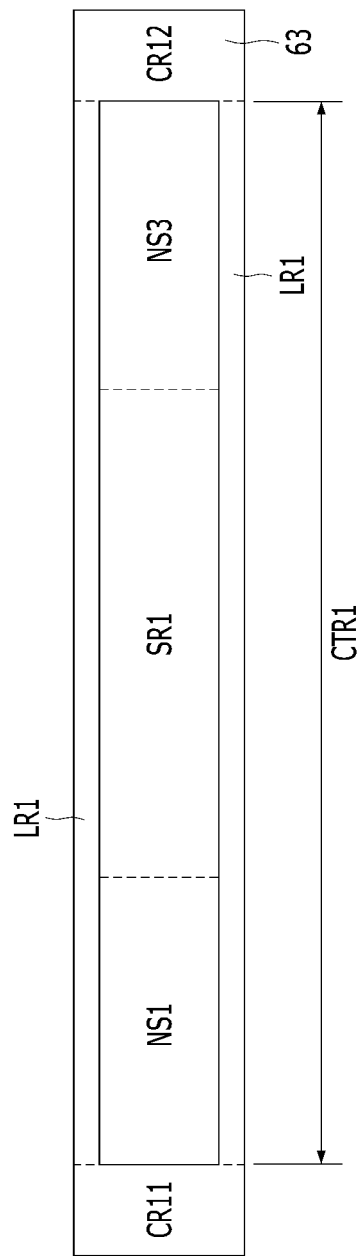
Figure 6B:
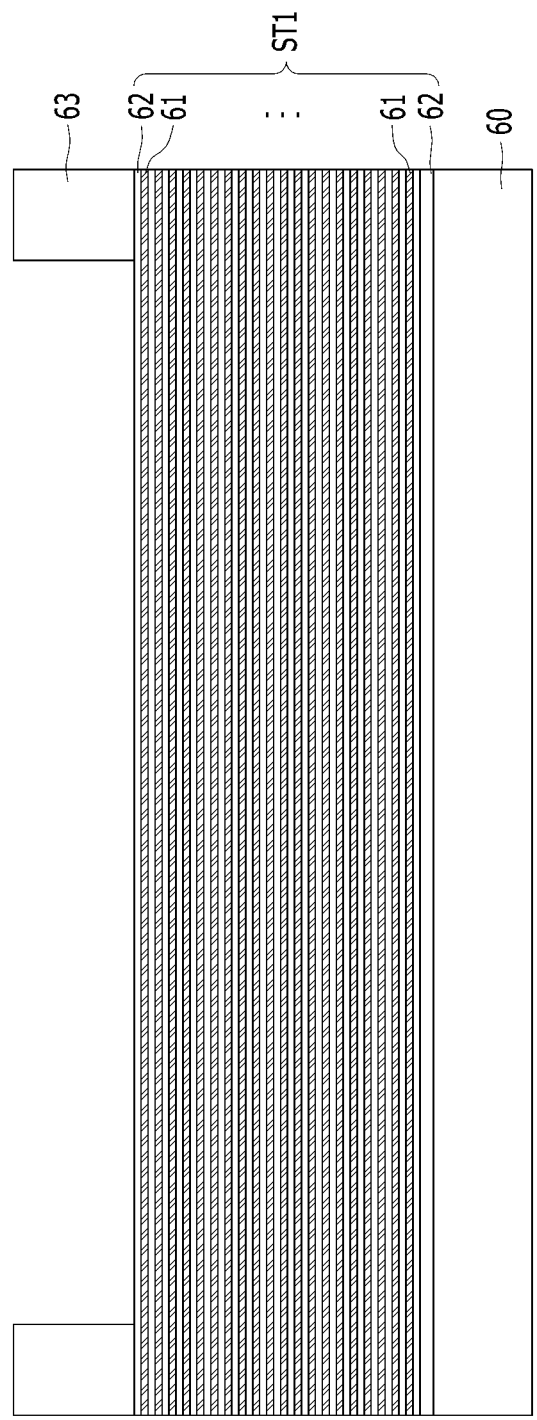

Referring to FIGS. 6A and 6B, a first stack ST1 may be formed. For example, the first stack ST1 may be formed by alternately stacking first material layers 61 and second material layers 62 on a base 60. The base 60 may include a substrate, a peripheral circuit, an interconnection structure, a source structure, and the like.

The first material layers 61 may be used to form gate lines such as word lines, source select lines, and drain select lines. The second material layers 62 may be used to insulate the stacked gate lines. The first material layers 61 may each include a material with a high etching selectivity with respect to the second material layers 62. For example, the first material layers 61 may each include a sacrificial material such as nitride, and the second material layers 62 may each include an insulating material such as oxide. As another example, the first material layers 61 may each include a conductive material such as polysilicon or metal, and the second material layers 62 may each include an insulating material such as oxide.

The first stack ST1 may include a first cell region CR11, a second cell region CR12, and a first contact region CTR1 located between the first cell region CR11 and the second cell region CR12. The first contact region CTR1 may include a first step region SR1, a first wiring region LR1, a first non-step region NS1, and a third non-step region NS3, or a combination thereof.

The first step region SR1 may be a region for forming first pads exposing the first material layers 61, respectively. The first wiring region LR1 may be a region for forming first wiring lines connecting the first pads and the first cell region CR11. The first non-step region NS1 and the third non-step region NS3 may be regions where the first material layers 61 are to be removed in order to reduce the parasitic capacitance of the first contact region CTR1. The first non-step region NS1 may be located between the first cell region CR11 and the first step region SR1. The third non-step region NS3 may be located between the second cell region CR12 and the first step region SR1.

Subsequently, a first hard mask pattern 63 may be formed on the first stack ST1. The first hard mask pattern 63 may cover the first cell region CR11, the second cell region CR12, and the first wiring region LR1, and may expose the first step region SR1, the first non-step region NS1, and the third non-step region NS3 (See FIGS. 6A and 6B). The first hard mask pattern 63 may include a material with a high etching selectivity with respect to the first stack ST1. For example, the first hard mask pattern 63 may include polysilicon.

Figure 7A:
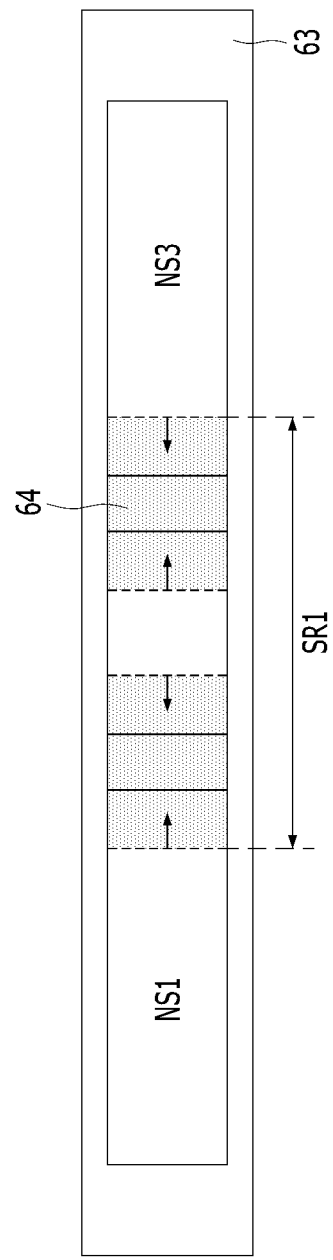
Figure 7B:
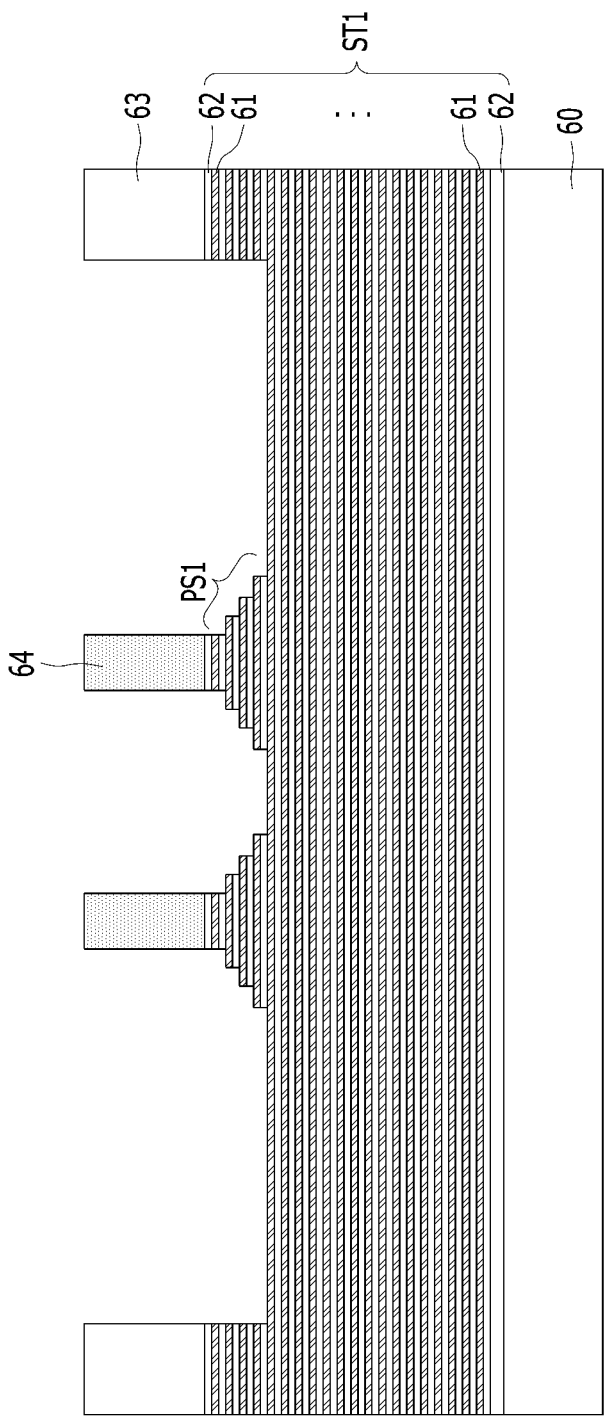

Referring to FIGS. 7A and 7B, a first mask pattern 64 may be formed on the first stack ST1. The first mask pattern 64 may be used to form a first preliminary step structure PS1 in the first step region SR1. The first mask pattern 64 may cover at least the first step region SR1 and additionally cover at least a part of the first hard mask pattern 63. The number of first mask patterns 64 may be changed according to the number of first material layers 61 included in the first stack ST1 and the number of step structures to be formed. Accordingly, the first mask pattern 64 may cover all or a part of the first step region SR1.

Subsequently, the first stack ST1 may be repeatedly etched using the first mask pattern 64 and the first hard mask pattern 63 as etch barriers. By repeating the process of reducing the first mask pattern 64 and etching the first stack ST1 using the first mask pattern 64 and the first hard mask pattern 63 as etch barriers, the first preliminary step structure PS1 having a step shape may be formed. The first preliminary step structure PS1 may have a step shape exposing the first material layers 61, respectively.

When the first preliminary step structure PS1 is formed, the first non-step region NS1 and the third non-step region NS3 may be exposed by the first mask pattern 64 and the first hard mask pattern 63. Accordingly, in the process of forming the first preliminary step structure PS1, the first non-step region NS1 and the third non-step region NS3 of the first stack ST1 may be etched.

When the first preliminary step structure PS1 is formed, the first cell region CR11, the second cell region CR12, and the first wiring region LR1 may be protected by the first hard mask pattern 63. Accordingly, even though the etching process is repeatedly performed in order to form the first preliminary step structure PS1, the first cell region CR11, the second cell region CR12, and the first wiring region LR1 are not etched. Subsequently, the first mask pattern 64 may be removed.

Figure 8B:
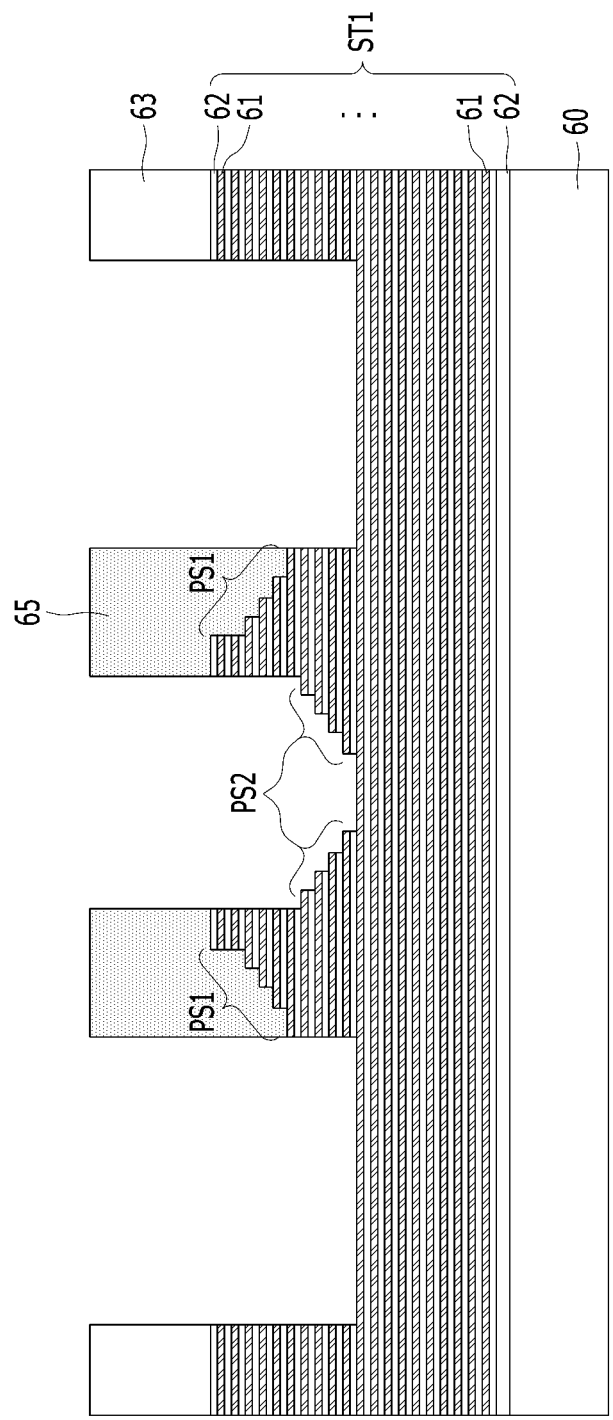

Referring to FIGS. 8A and 8B, a second mask pattern 65 may be formed on the first stack ST1. The second mask pattern 65 may be used to form a second preliminary step structure PS2. The second mask pattern 65 may cover a part of the first preliminary step structure PS1.

Subsequently, the first stack ST1 may be etched using the second mask pattern 65 and the first hard mask pattern 63 as etch barriers to form the second preliminary step structure PS2. A portion of the first preliminary step structure PS1 exposed by the second mask pattern 65 may be transferred into the first stack ST1 to form the second preliminary step structure PS2.

When the second preliminary step structure PS2 is formed, the first non-step region NS1 and the third non-step region NS3 may be exposed by the second mask pattern 65 and the first hard mask pattern 63. Accordingly, in the process of forming the second preliminary step structure PS2, the first non-step region NS1 and the third non-step region NS3 of the first stack ST1 may be etched.

When the second preliminary step structure PS2 is formed, the first cell region CR11, the second cell region CR12, and the first wiring region LR1 may be protected by the first hard mask pattern 63. Accordingly, when the second preliminary step structure PS2 is formed, the first cell region CR11, the second cell region CR12, and the first wiring region LR1 are not etched. Subsequently, the second mask pattern 65 may be removed.

Figure 9A:
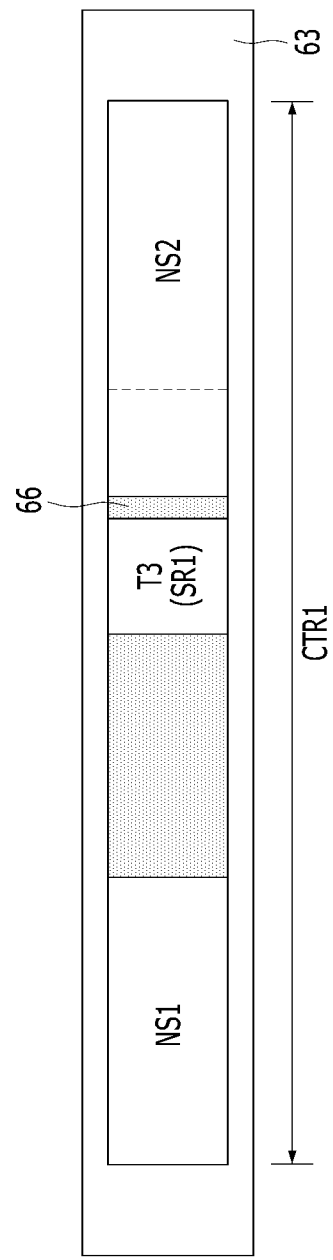
Figure 9B:
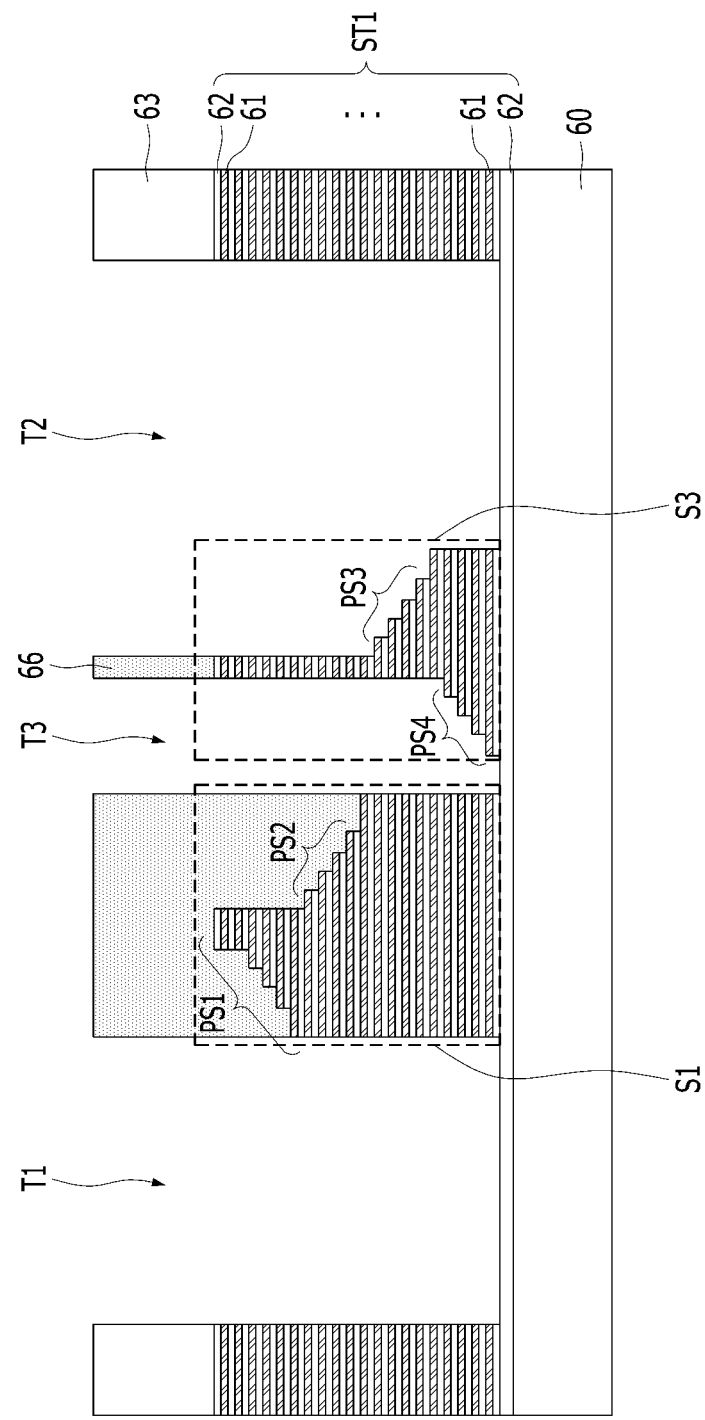

Referring to FIGS. 9A and 9B, a third mask pattern 66 may be formed on the first stack ST1. The third mask pattern 66 may be used to form a third preliminary step structure PS3 and a fourth preliminary step structure PS4. The third mask pattern 66 may cover a part of the first preliminary step structure PS1 and the second preliminary step structure PS2.

Subsequently, the first stack ST1 may be etched using the third mask pattern 66 and the first hard mask pattern 63 as etch barriers to form the third and fourth preliminary step structures PS3 and PS4. A portion of the first preliminary step structure PS1 exposed by the third mask pattern 66 may be transferred into the first stack ST1 to form the third preliminary step structure PS3. A portion of the second preliminary step structure PS2 exposed by the third mask pattern 66 may be transferred into the first stack ST1 to form the fourth preliminary step structure PS4.

When the third and fourth preliminary step structures PS3 and PS4 are formed, the first non-step region NS1 and the third non-step region NS3 may be exposed by the third mask pattern 66 and the hard mask pattern 63. Accordingly, in the process of forming the third preliminary step structure PS3 and the fourth preliminary step structure PS4, the first non-step region NS1 and the third non-step region NS3 of the first stack ST1 may be etched.

When the third preliminary step structure PS3 and the fourth preliminary step structure PS4 are formed, the first cell region CR11, the second cell region CR12, and the first wiring region LR1 may be protected by the hard mask pattern 63. Accordingly, when the third preliminary step structure PS3 and the fourth preliminary step structure PS4 are formed, the first cell region CR11, the second cell region CR12, and the first wiring region LR1 are not etched. Through this, a first step structure S1 including the first preliminary step structure PS1 and the second preliminary step structure PS2 may be formed. A third step structure S3 including the third preliminary step structure PS3 and the fourth preliminary step structure PS4 may be formed.

In the process of forming the first step structure S1 and the third step structure S3, a first trench T1 may be formed in the first non-step region NS1 of the first stack ST1. A second trench T2 may be formed in the third non-step region NS3. A third trench T3 may be formed between the first step structure S1 and the third step structure S3.

By forming at least one of the first to third trenches T1 to T3 in the first stack ST1, the first material layers 61 of the first contact region CTR1 may be partially removed. While maintaining the connection among the first cell region CR11, the second cell region CR12, and the first step region SR1 through the first wiring regions LR1, an area of the first material layers 61 in the first contact region CTR1 may be reduced. Subsequently, the third mask pattern 66 may be removed. The first hard mask pattern 63 may be removed.

A mask pattern may be additionally formed according to the number of first material layers 61 included in the first stack ST1. Through this, a part of the first to fourth preliminary step structures PS1 to PS4 may be transferred into the first stack ST1 to additionally form a preliminary step structure.

Figure 10A:
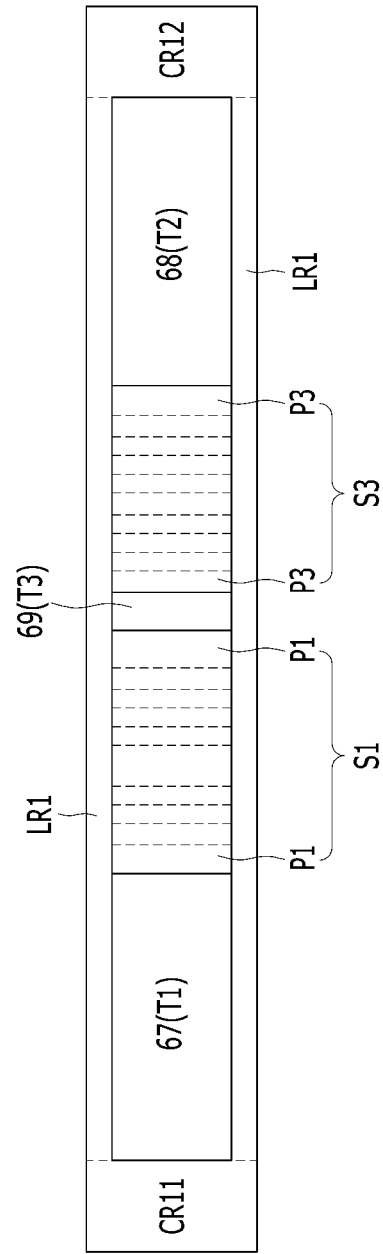
Figure 10B:
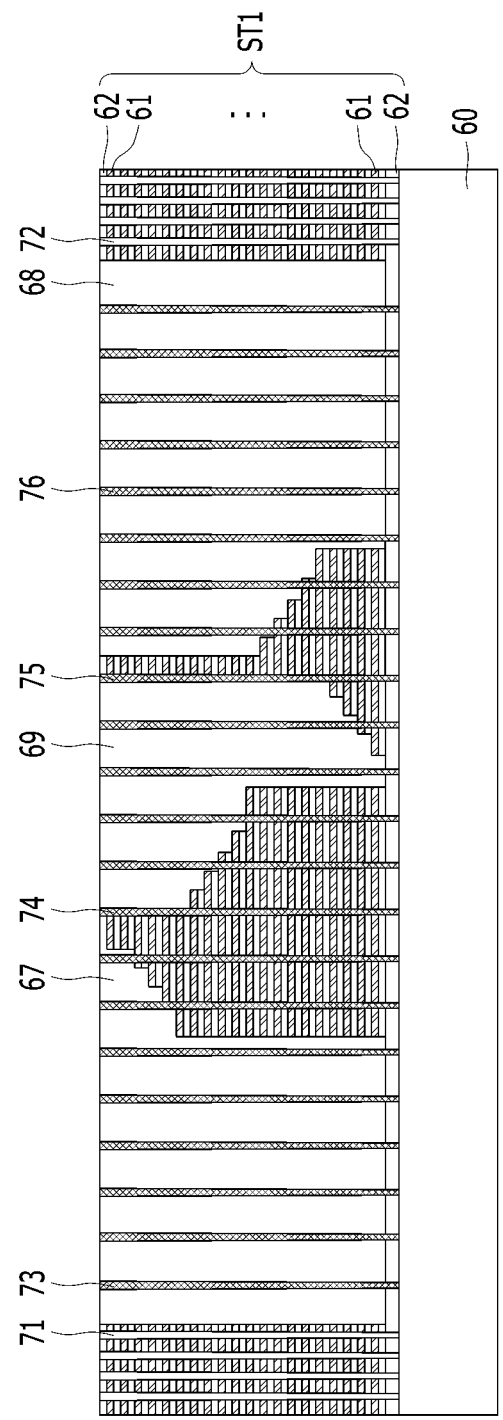

Referring to FIGS. 10A and 10B, at least one of a first gap-fill insulating layer 67, a third gap-fill insulating layer 68, and a fourth gap-fill insulating layer 69 may be formed in the first stack ST1. The first gap-fill insulating layer 67 may be formed in the first trench T1. For example, an insulating layer may be formed on the first stack ST1 and a planarization process may be performed to form the first gap-fill insulating layer 67. The first gap-fill insulating layer 67 may include an insulating material such as oxide or nitride. The planarization process may be performed using a chemical mechanical polishing (CMP) method. The third gap-fill insulating layer 68 may be formed in the second trench T2, and the fourth gap-fill insulating layer 69 may be formed in the third trench T3.

Through this, the first non-step region NS1 may be replaced with the first gap-fill insulating layer 67, and the third non-step region NS3 may be replaced with the third gap-fill insulating layer 68. Accordingly, a portion of the first contact region CTR1 in which no step structure is formed may be replaced with a low-k material.

Subsequently, at least one of first channel structures 71 and second channel structures 72 may be formed. The first channel structures 71 may be located in the first cell region CR11 and may extend to the base 60 through the first stack ST1. The second channel structures 72 may be located in the second cell region CR12 and may extend to the base 60 through the first stack ST1. Sacrificial layers may also be formed instead of forming the first and second channel structures 71 and 72.

At least one of a first support 73, a second support 74, a third support 75, and a fourth support 76 may be formed. The first support 73 may extend through the first gap-fill insulating layer 67. The second support 74 may extend through the first step structure S1, may extend through the first gap-fill insulating layer 67 and the first step structure S1, or may extend through the fourth gap-fill insulating layer 69 and the first step structure S1. The third support 75 may extend through the third step structure S3, may extend through the fourth gap-fill insulating layer 69 and the third step structure S3, or may extend through the third gap-fill insulating layer 68 and the third step structure S3. The fourth support 76 may extend through the third gap-fill insulating layer 68. Sacrificial layers may also be formed instead of forming the first to fourth supports 73 to 76. When the first and second channel structures 71 and 72 are formed, the first to fourth supports 73 to 76 may be formed.

Figure 11A:
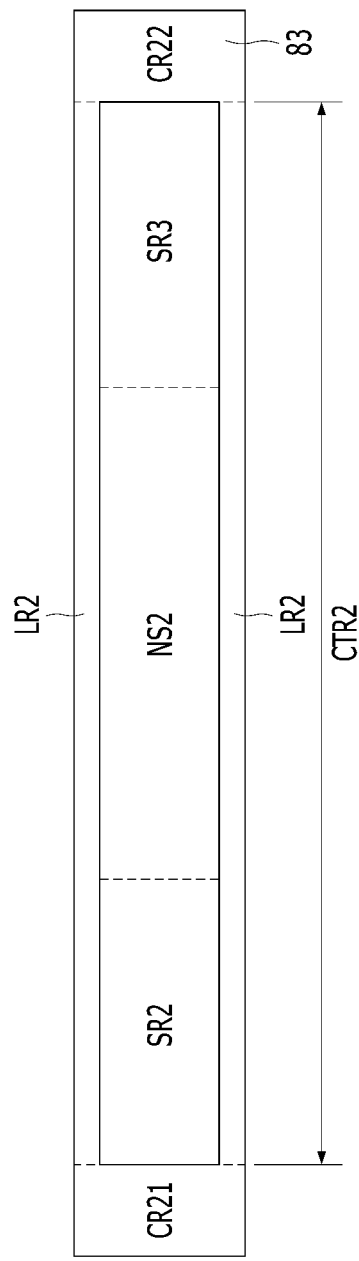
Figure 11B:
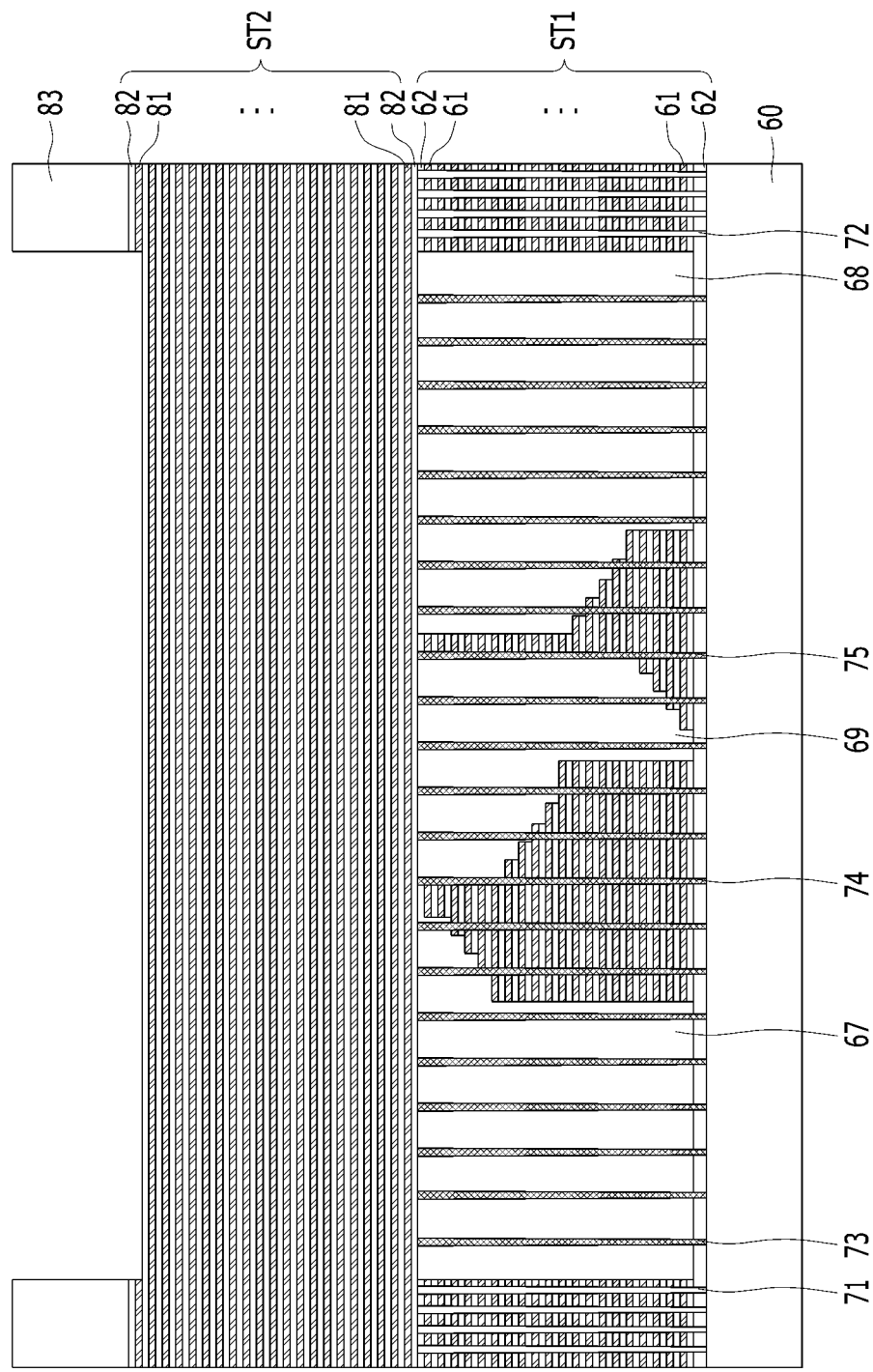

Referring to FIGS. 11A and 11B, a second stack ST2 may be formed on the first stack ST1. The second stack ST2 may include first material layers 81 and second material layers 82 that are alternately stacked.

The first material layers 81 may be used to form gate lines such as word lines, source select lines, and drain select lines. The second material layers 82 may be used to insulate the stacked gate lines. The first material layers 81 may each include a material with a high etching selectivity with respect to the second material layers 82. For example, the first material layers 81 may each include a sacrificial material such as nitride, and the second material layers 82 may each include an insulating material such as oxide. As another example, the first material layers 81 may each include a conductive material such as polysilicon or metal, and the second material layers 82 may each include an insulating material such as oxide.

The second stack ST2 may include a first cell region CR21, a second cell region CR22, and a second contact region CTR2. The second contact region CTR2 may be located between the first cell region CR21 and the second cell region CR22. The second contact region CTR2 may include a second step region SR2, a third step region SR3, a second wiring region LR2, and a second non-step region NS2, or a combination thereof. The second non-step region NS2 may be located between the second step region SR2 and the third step region SR3.

The second step region SR2 may comprise second pads exposing the first material layers 81, respectively. The third step region SR3 may comprise third pads exposing the first material layers 81, respectively. The second wiring area LR2 may comprise second wiring lines. The third non-step region NS3 may be a region from which the first material layers 81 are to be removed in order to reduce the parasitic capacitance of the second contact region CTR2.

The second wiring area LR2 may be located on the first wiring area LR1. The second wiring region LR2 may connect the second step region SR2 and the second cell region CR22. The second wiring region LR2 may connect the third step region SR3 and the first cell region CR21. The second step region SR2 may be connected in common to the first cell region CR21 and the second cell region CR22 by the second wiring region LR2. The third step region SR3 may be connected in common to the first cell region CR21 and the second cell region CR22 by the second wiring region LR2.

Subsequently, a second hard mask pattern 83 may be formed on the second stack ST2. The second hard mask pattern 83 may cover the first cell region CR21, the second cell region CR22, and the second wiring region LR2, and may expose the second step region SR2, the third step region SR3, and the second non-step region NS2.

Figure 12A:
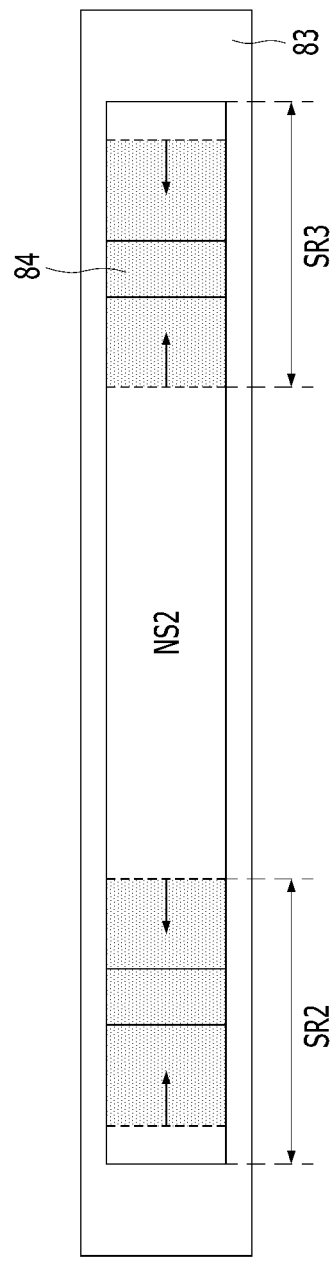
Figure 12B:
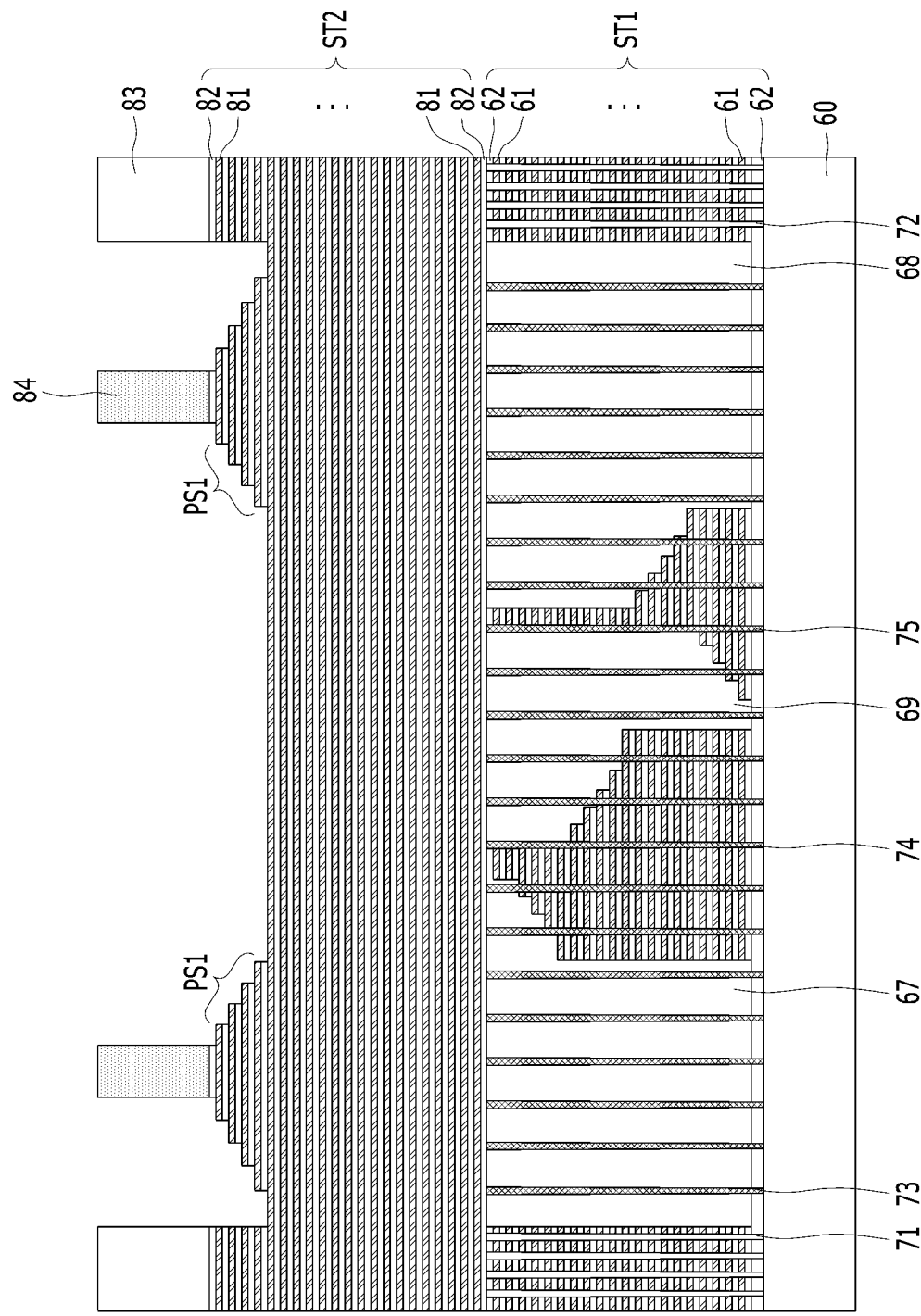

Referring to FIGS. 12A and 12B, a first mask pattern 84 may be formed on the second stack ST2. The first mask pattern 84 may be used to form the first preliminary step structure PS1 located in the second step region SR2 and the third step region SR3. The first mask pattern 84 may cover at least the second step region SR2 and the third step region SR3, and additionally cover the second hard mask pattern 83. The first mask pattern 84 may cover all or a part of the second step region SR2. The first mask pattern 84 may cover all or a part of the third step region SR3.

Subsequently, the second stack ST2 may be repeatedly etched using the first mask pattern 84 and the second hard mask pattern 83 as etch barriers. By repeating the process of reducing the first mask pattern 84 and etching the second stack ST2 using the first mask pattern 84 and the second hard mask pattern 83 as etch barriers, the first preliminary step structure PS1 having a step shape may be formed.

When the first preliminary step structure PS1 is formed, the second non-step region NS2 may be exposed by the first mask pattern 84 and the second hard mask pattern 83. Accordingly, in the process of forming the first preliminary step structure PS1, the second non-step region NS2 of the second stack ST2 may be etched. When the first preliminary step structure PS1 is formed, the first cell region CR21, the second cell region CR22, and the second wiring region LR2 may be protected by the second hard mask pattern 83. Subsequently, the first mask pattern 84 may be removed.

Figure 13A:
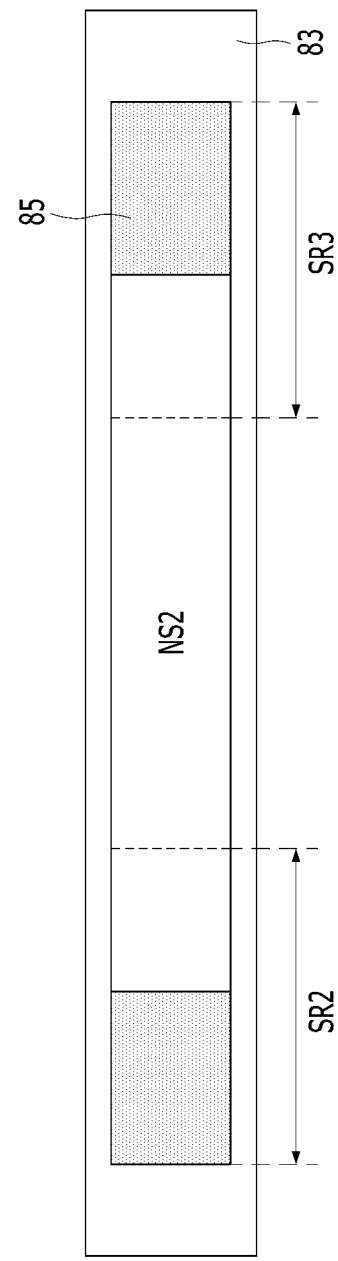
Figure 13B:
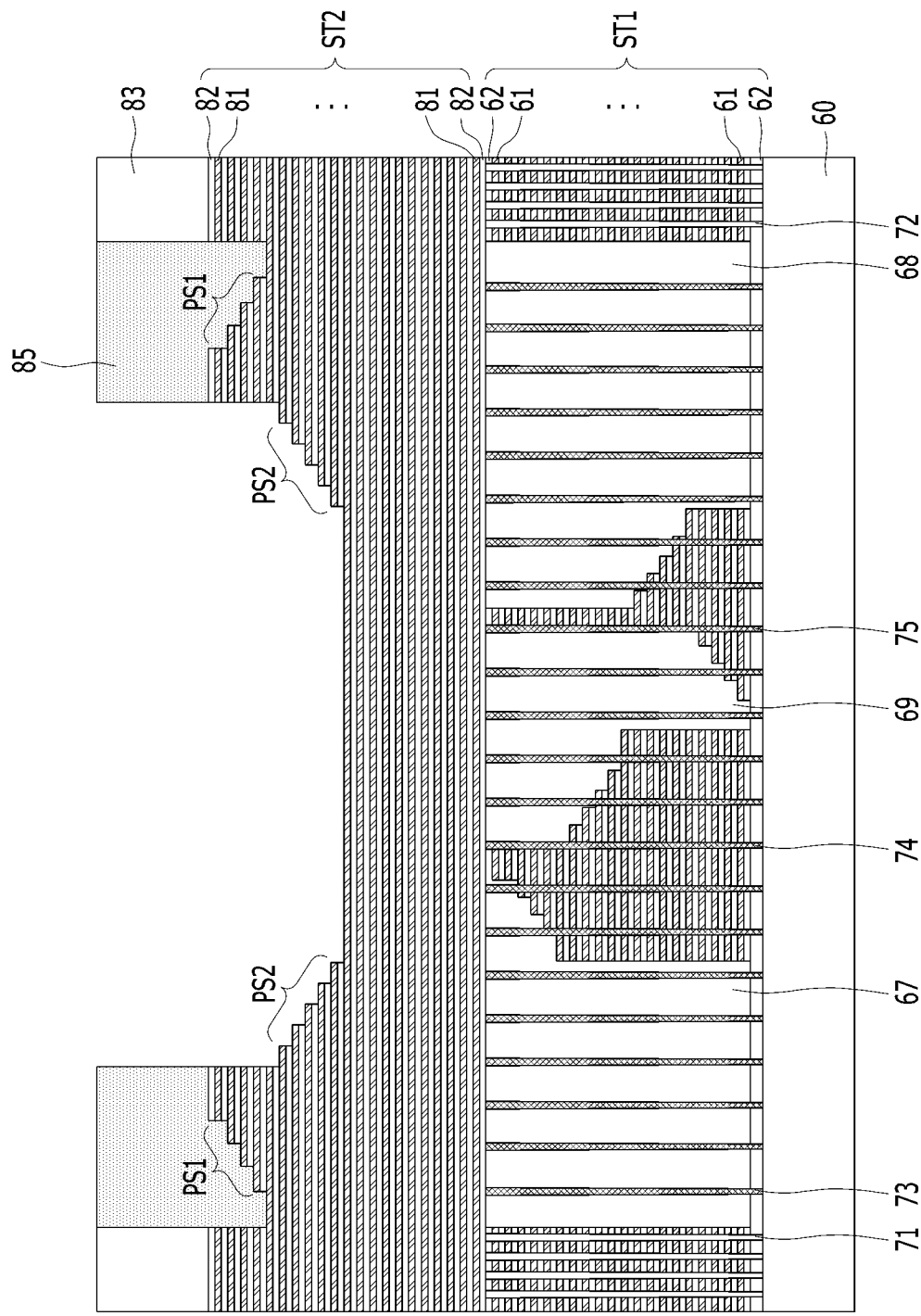

Referring to FIGS. 13A and 13B, a second mask pattern 85 may be formed on the second stack ST2. The second mask pattern 85 may be used to form the second preliminary step structure PS2. The second mask pattern 85 may partially cover the first preliminary step structure PS1.

Subsequently, the second stack ST2 may be etched using the second mask pattern 85 and the second hard mask pattern 83 as etch barriers to form the second preliminary step structure PS2. A portion of the first preliminary step structure PS1 exposed by the second mask pattern 85 may be transferred into the second stack ST2 to form the second preliminary step structure PS2.

When the second preliminary step structure PS2 is formed, the second non-step region NS2 may be exposed by the second mask pattern 85 and the second hard mask pattern 83. Accordingly, in the process of forming the second preliminary step structure PS2, the second non-step region NS2 of the second stack ST2 may be etched.

When the second preliminary step structure PS2 is formed, the first cell region CR21, the second cell region CR22, and the second wiring region LR2 may be protected by the second hard mask pattern 83. Subsequently, the second mask pattern 85 may be removed.

Figure 14A:
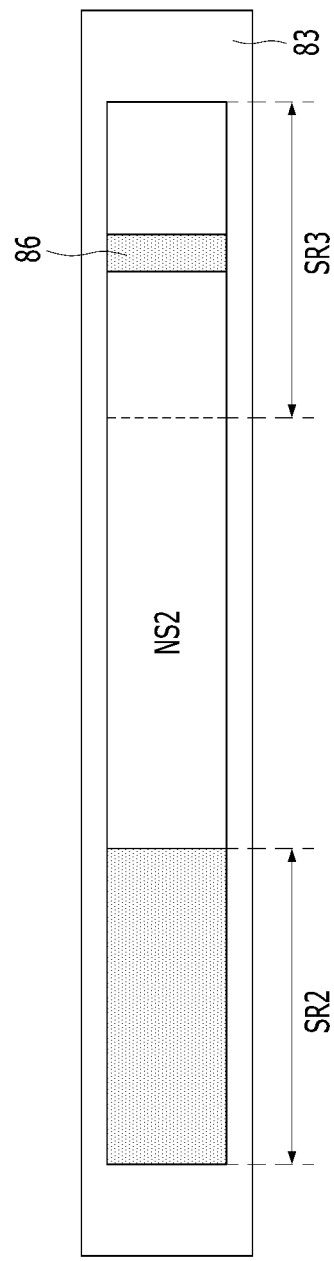
Figure 14B:
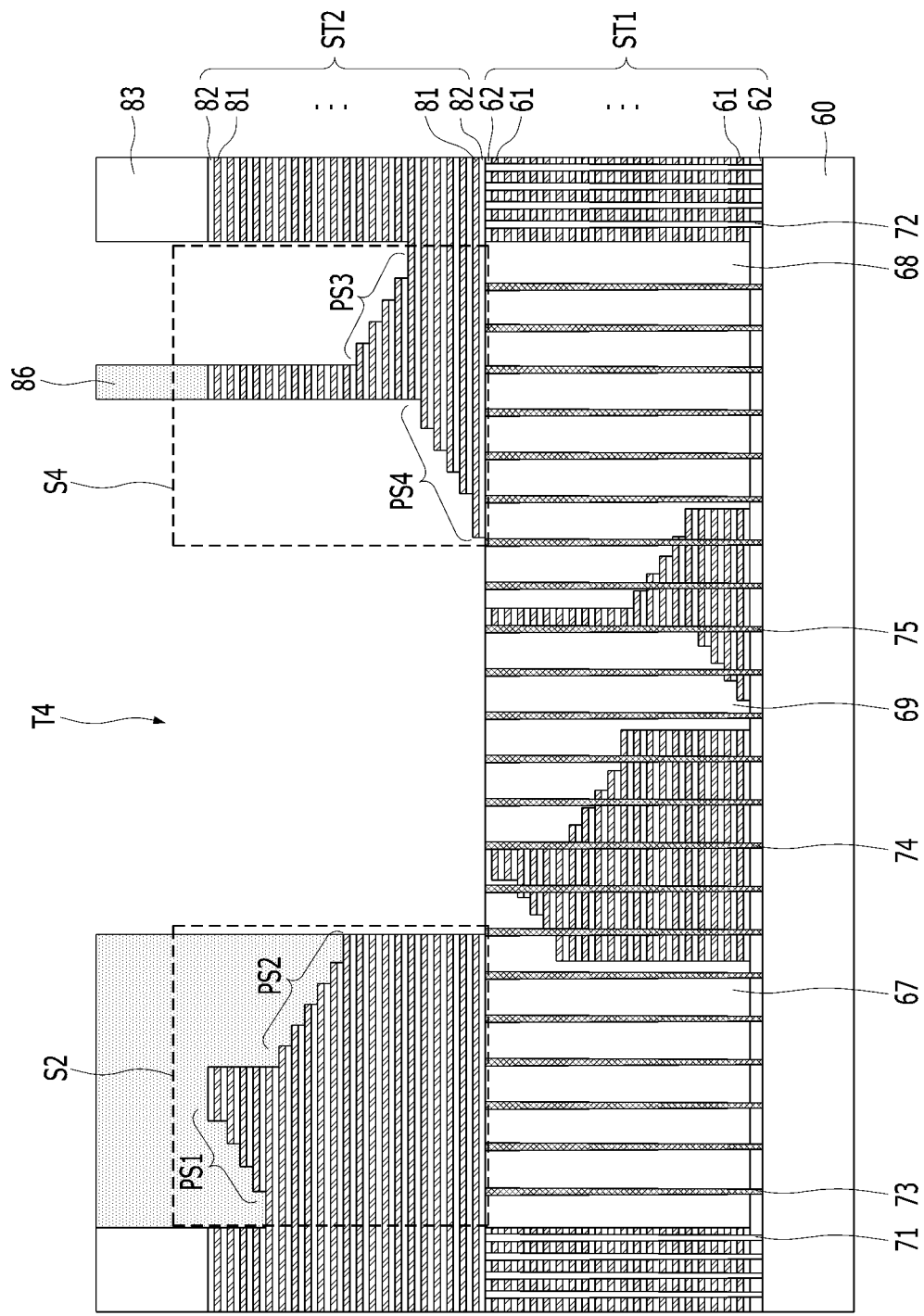

Referring to FIGS. 14A and 14B, a third mask pattern 86 may be formed on the second stack ST2. The third mask pattern 86 may be used to form the third preliminary step structure PS3 and the fourth preliminary step structure PS4. The third mask pattern 86 may cover a part of the first preliminary step structure PS1 and the second preliminary step structure PS2.

Subsequently, the second stack ST2 may be etched using the third mask pattern 86 and the second hard mask pattern 83 as etch barriers to form the third preliminary step structure PS3 and the fourth preliminary step structure PS4. A portion of the first preliminary step structure PS1 exposed by the third mask pattern 86 may be transferred into the second stack ST2 to form the third preliminary step structure PS3. A portion of the second preliminary step structure PS2 exposed by the third mask pattern 86 may be transferred into the second stack ST2 to form the fourth preliminary step structure PS4.

When the third preliminary step structure PS3 and the fourth preliminary step structure PS4 are formed, the second non-step region NS2 may be exposed by the third mask pattern 86 and the second hard mask pattern 83. Accordingly, in the process of forming the third preliminary step structure PS3 and the fourth preliminary step structure PS4, the second non-step region NS2 of the second stack ST2 may be etched.

When the third preliminary step structure PS3 and the fourth preliminary step structure PS4 are formed, the first cell region CR21, the second cell region CR22, and the second wiring region LR2 may be protected by the second hard mask pattern 83. Accordingly, when the third preliminary step structure PS3 and the fourth preliminary step structure PS4 are formed, the first cell region CR21, the second cell region CR22, and the second wiring region LR2 are not etched. Through this, a second step structure S2 including the first preliminary step structure PS1 and the second preliminary step structure PS2 and located on the first gap-fill insulating layer 67 may be formed. A fourth step structure S4 including the third preliminary step structure PS3 and the fourth preliminary step structure PS4 and located on the third gap-fill insulating layer 68 may be formed.

In the process of forming the second step structure S2 and the fourth step structure S4, a fourth trench T4 may be formed in the second non-step region NS2 of the second stack ST2. The fourth trench T4 may be formed between the second step structure S2 and the fourth step structure S4. Subsequently, the third mask pattern 86 may be removed.

A mask pattern may be additionally formed according to the number of first material layers 81 included in the second stack ST2. Through this, a part of the first to fourth preliminary step structures PS1 to PS4 may be transferred into the second stack ST2 to additionally form a preliminary step structure.

Figure 15A:
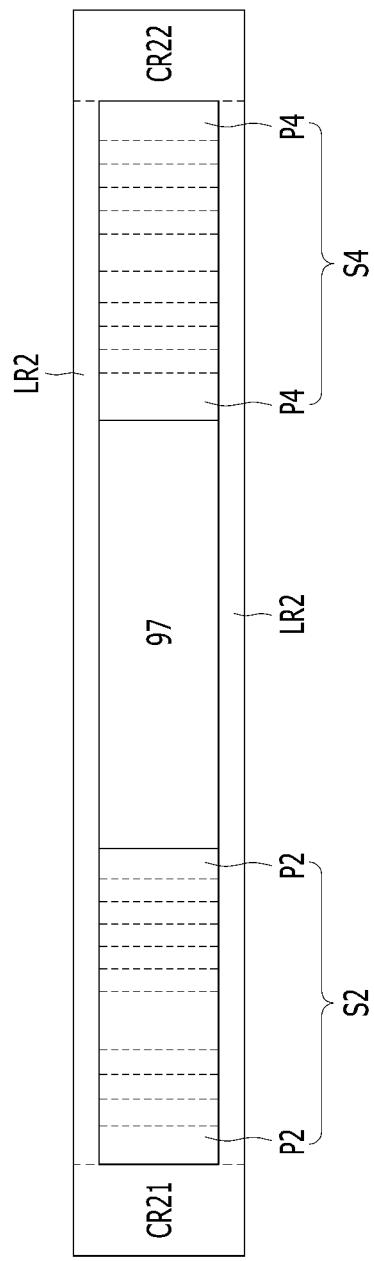
Figure 15B:
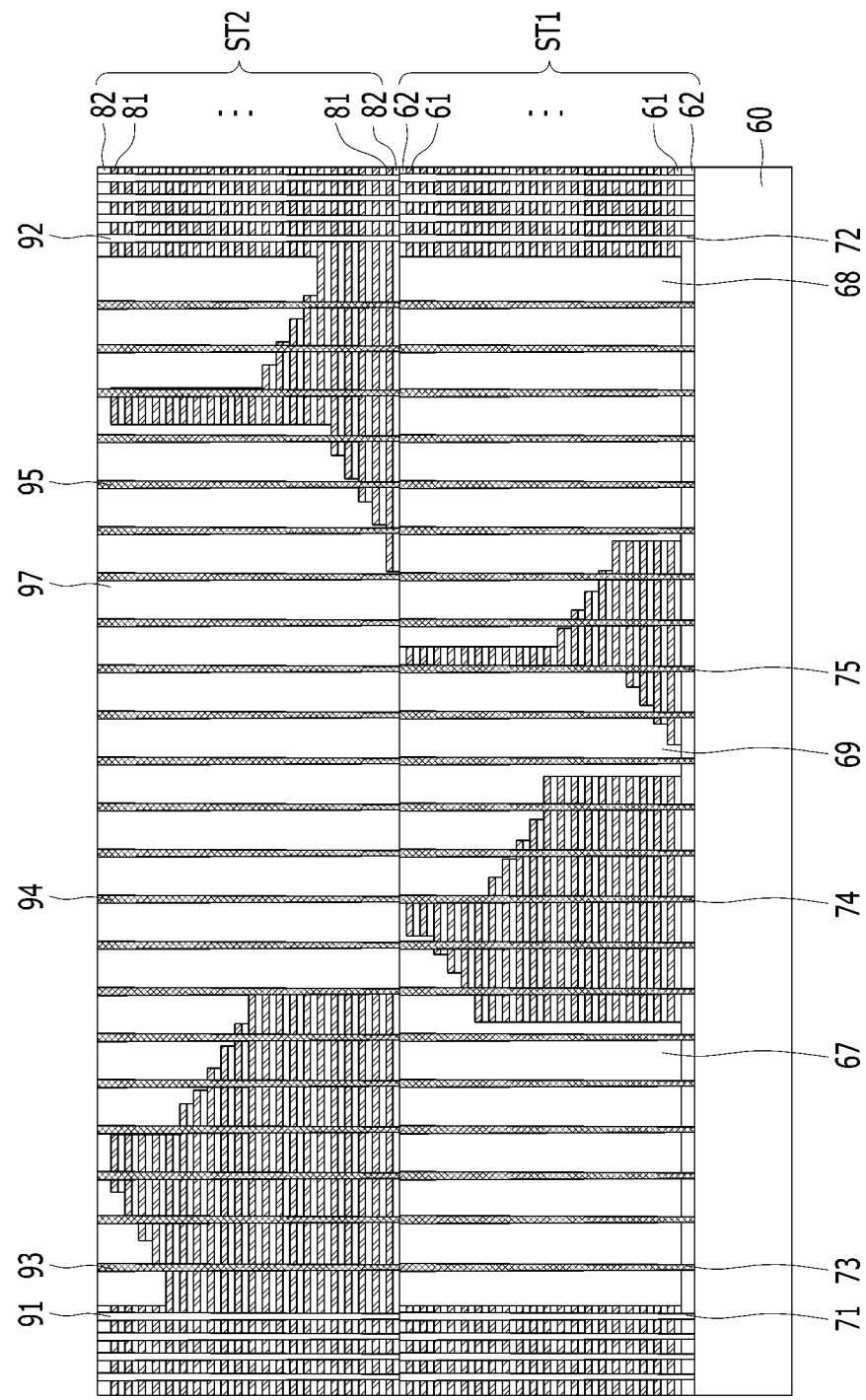

Referring to FIGS. 15A and 15B, a second gap-fill insulating layer 97 may be formed in the fourth trench T4. Through this, the second non-step region NS2 of the second stack ST2 may be replaced with the second gap-fill insulating layer 97.

Subsequently, at least one of first channel structures 91 and second channel structures 92 may be formed. The first channel structures 91 may extend through the first cell region CR21 of the second stack ST2, and may be connected to the first channel structures 71, respectively. The second channel structures 72 may extend through the second cell region CR22 of the second stack ST2, and may be connected to the second channel structures 72, respectively. When sacrificial layers are formed instead of the first and second channel structures 71 and 72, the sacrificial layers may be removed, and the first and second channel structures 71 and 72 extending through the first stack ST1 and the second stack ST2 may be formed.

At least one of a first support 93, a second support 94, a third support 95, and a fourth support 96 may be formed. The first support 93 may extend through the second step structure S2 or through the second gap-fill insulating layer 97 and the second step structure S2, and may be connected to the first support 73. The second support 94 may extend through the second gap-fill insulating layer 97 and may be connected to the second support 74. The third support 95 may extend through the second gap-fill insulating layer 97 and the fourth step structure S4, and may be connected to the third support 75. The fourth support 96 may extend through the fourth step structure S4 or through the second gap-fill insulating layer 97 and the fourth step structure S4, and may be connected to the fourth support 76.

Figure 16A:
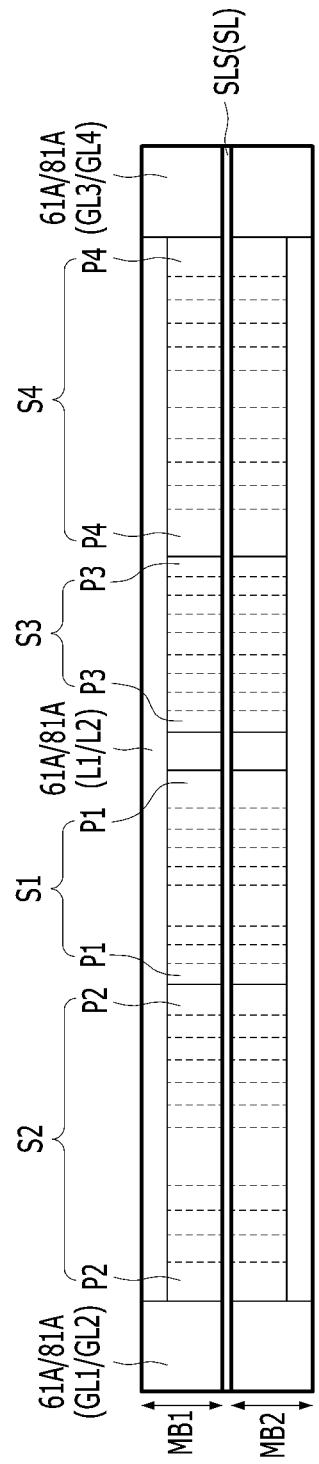
Figure 16B:
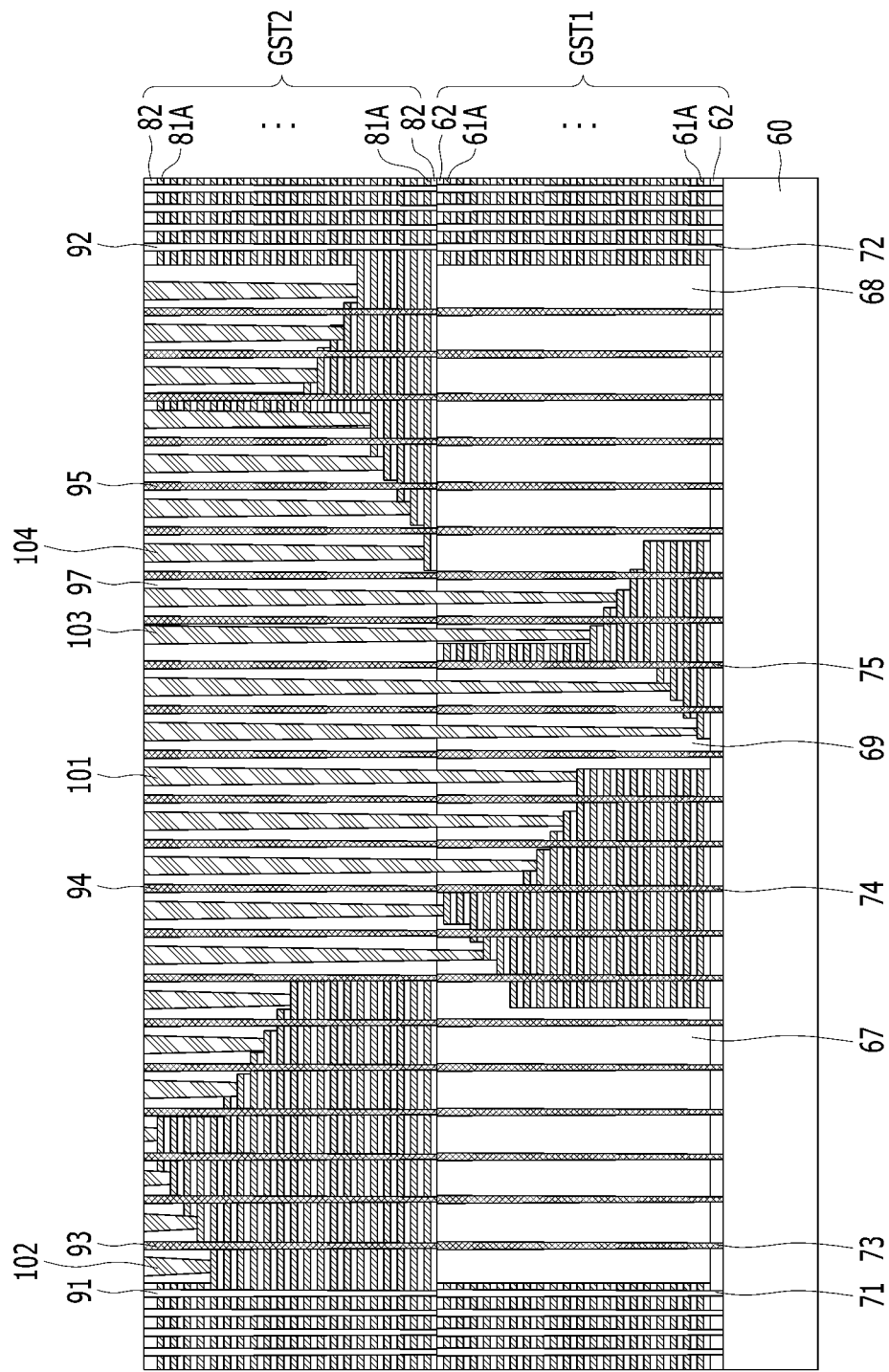

Referring to FIGS. 16A and 16B, the first material layers 61 and 81 may be replaced with third material layers 61A and 81A. For example, a slit SL extending through the first stack ST1 and the second stack ST2 may be formed, and the first material layers 61 and 81 may be removed through the slit SL. Subsequently, the third material layers 61A and 81A may be formed in regions where the first material layers 61 and 81 are removed. As another example, the third material layers 61A and 81A may be formed by performing a silicidation process for reducing the resistivity of the first material layers 61 and 81.

Through this, a first gate structure GST1 including the third material layers 61A and the second material layers 62 that are alternately stacked may be formed. A second gate structure GST2 including the third material layers 81A and the second material layers 82 that are alternately stacked may be formed. When the first material layers 61 and 81 each include a conductive material, the first material layers 61 and 81 may be used as the third material layers 61A and 81A as they are. In such a case, the first stack ST1 may be the first gate structure GST1, and the second stack ST2 may be the second gate structure GST2.

Each of the third material layers 61A may include a first gate line GL1, the first step structure S1, and a first connection wiring line L1, and may further include at least one of a third gate line GL3 and the third step structure S3. Each of the third material layers 81A may include a second gate line GL2, the second step structure S2, and a second connection wiring line L2, and may further include at least one of a fourth gate line GL4 and the fourth step structure S4.

Subsequently, a slit structure SLS may be formed in the slit SL. The first and second gate structures GST1 and GST2 may be separated into a first memory block MB1 and a second memory block MB2 by the slit structure SLS. For example, the slit structure SLS may include at least one of an insulating material, a semiconductor material and a conductive material. For example, the slit structure SLS may include a source contact structure connected to the source structure and an insulating spacer surrounding sidewalls of the source contact structure. The slit structure SLS may include an insulating material or a semiconductor material as a gap-fill layer.

Subsequently, at least one of first, second, third and fourth contact plugs 101, 102, 103, and 104 may be formed. The first contact plugs 101 may be connected to the first pads P1 of the first step structure S1, respectively. The second contact plugs 102 may be connected to the second pads P2 of the second step structure S2, respectively. The third contact plugs 103 may be connected to the third pads P3 of the third step structure S3, respectively. The fourth contact plugs 104 may be connected to the fourth pads P4 of the fourth step structure S4, respectively.

Subsequently, an interconnection structure connected to at least one of the first channel structures 71, the second channel structures 72, the first contact plugs 101, the second contact plugs 102, the third contact plugs 103, and the fourth contact plugs 104 may be formed. For example, bit lines connected to the first channel structures 71 and the second channel structures 72 may be formed, or bonding pads connected to the interconnection structure may be formed.

Although not illustrated in the drawings, a wafer bonding process may be additionally performed. A first wafer including the first gate structure GST1 and the second gate structure GST2 may be formed, and a second wafer including a peripheral circuit may be formed. Subsequently, the first wafer and the second wafer including peripheral circuits may be bonded to each other. Any suitable method for wafer bonding may be used including, for example, direct bonding, anodic bonding, or fusion bonding. Subsequently, the base 60 of the first wafer may be removed to expose the first and second channel structures 71 and 72, and the source structure connected to the first and second channel structures 71 and 72 may be formed. Through this, a semiconductor device including the first wafer and the second wafer may be manufactured.

According to the manufacturing method described above, when the step structures S1 to S4 are formed, the non-step regions NS1 to NS3 of the stacks ST1 and ST2 may be removed using the hard mask patterns 63 and 83 together with the mask patterns 64 to 66 and 84 to 86. Accordingly, the non-step regions NS1 to NS3 of the contact regions CTR1 and CTR2 may be replaced with the gap-fill insulating layers 67 to 69 and 97, and the parasitic capacitance of the contact regions CTR1 and CTR2 may be reduced. Preventing parasitic capacitance provides improved signal transmission, and reduced noise interference.

Although embodiments according to the technical concepts of the present invention disclosure have been described above with reference to the accompanying drawings, this is only for explaining the embodiments according to the concept of the present invention disclosure, and the present invention disclosure is not limited to the above embodiments. Various types of substitutions, modifications, and changes for the embodiments may be made by those skilled in the art, to which the present invention disclosure pertains, without departing from the technical idea of the present invention disclosure defined in the following claims, and it should be construed that these substitutions, modifications, and changes belong to the scope of the present invention disclosure.

What is claimed is:

1. A semiconductor device comprising:
   a first gate structure, comprising:
      first gate lines stacked;
      a first step structure including first pads stacked in a stair shape;
      a first gap-fill insulating layer disposed between the first gate lines and the first step structure; and
      first wiring lines stacked to electrically connect the first gate lines to respective first pads;
   and
   a second gate structure, comprising:
      second gate lines stacked over the first gate lines;
      a second step structure disposed on the first gap-fill insulating layer and including second pads stacked in a stair shape;
      a second gap-fill insulating layer disposed on the first step structure; and
      second wiring lines stacked to electrically connect the second gate lines to respective second pads.

2. The semiconductor device of claim 1, wherein the first wiring lines extend along a sidewall of the first step structure and a sidewall of the first gap-fill insulating layer.

3. The semiconductor device of claim 1, further comprising:
   first channel structures extending through the second gate lines and the first gate lines.

4. The semiconductor device of claim 1, further comprising:

a first support extending through the second step structure and the first gap-fill insulating layer; and a second support extending through the second gap-fill insulating layer and the first step structure.

5. The semiconductor device of claim 1, wherein the first gate structure further comprises:

third gate lines connected to the first pads through the first wiring lines, respectively, and wherein the first gap-fill insulating layer and the first step structure are disposed between the first gate lines and the third gate lines.

6. The semiconductor device of claim 5, wherein the first gate structure further comprises:

a third step structure disposed below the second gap-fill insulating layer and including third pads; and a third gap-fill insulating layer disposed between the third step structure and the third gate lines.

7. The semiconductor device of claim 6, wherein the first wiring lines connect the third pads to the first gate lines and the third gate lines in common.

8. The semiconductor device of claim 7, wherein the first wiring lines extend along a sidewall of the third step structure and a sidewall of the third gap-fill insulating layer.

9. The semiconductor device of claim 7, further comprising:

a third support extending through the third step structure and the second gap-fill insulating layer.

10. The semiconductor device of claim 1, wherein the second gate structure further comprises:

fourth gate lines connected to the second pads through the second wiring lines, respectively, wherein the second step structure and the second gap-fill insulating layer are disposed between the second gate lines and the fourth gate lines.

11. The semiconductor device of claim 10, wherein the second gate structure further comprises:

a fourth step structure disposed between the second gap-fill insulating layer and the fourth gate lines and including fourth pads.

12. The semiconductor device of claim 11, wherein the second wiring lines connect the second pads to the second gate lines and the fourth gate lines in common, and the second wiring lines connect the fourth pads to the second gate lines and the fourth gate lines in common.

13. The semiconductor device of claim 11, wherein the second wiring lines extend along a sidewall of the second gap-fill insulating layer and a sidewall of the fourth step structure.

14. The semiconductor device of claim 11, wherein the first gate structure further comprises:

a third gap-fill insulating layer disposed below the fourth step structure.

15. The semiconductor device of claim 14, further comprising:

a fourth support extending through the fourth step structure and the third gap-fill insulating layer.

16. A semiconductor device, comprising:

a first gate structure including first gate lines, a first step structure including first pads, a first gap-fill insulating layer disposed between the first gate lines and the first step structure, and first wiring lines connecting the first gate lines and the first pads, respectively;

a second gate structure including second gate lines disposed over the first gate lines, a second step structure disposed on the first gap-fill insulating layer and including second pads, a second gap-fill insulating layer disposed on the first step structure, and second wiring lines connecting the second gate lines and the second pads, respectively; and a peripheral circuit for driving a cell array including the first gate structure and the second gate structure, wherein the peripheral circuit is electrically connected to the cell array through a bonding pad.

17. A semiconductor device comprising:

stacked first gate lines;

a first step structure including first pads connected to the first gate lines;

a first gap-fill insulating layer disposed between the first gate lines and the first step structure;

stacked second gate lines;

a second step structure including second pads connected to the second gate lines;

a channel structure extending through the first gate lines and the second gate lines; and a support extending through the second step structure and the first gap-fill insulating layer.

18. The semiconductor device of claim 17, further comprising:

a peripheral circuit for driving a cell array including the first gate lines, the first step structure, the first gap-fill insulating layer, the second gate lines, the second step structure, the channel structure, and the support, wherein the peripheral circuit is electrically connected to the cell array through a bonding pad.

19. The semiconductor device of claim 18, wherein the peripheral circuit comprises:

a page buffer disposed to face the channel structure; and a row decoder disposed to face the first step structure and the second step structure.

20. The semiconductor device of claim 17, further comprising:

first wiring lines extending along a sidewall of the first step structure and the first gap-fill insulating layer and connecting the first gate lines and the first pads, respectively.

* * * * *